(12) United States Patent
Li

(10) Patent No.: US 11,203,250 B2
(45) Date of Patent: Dec. 21, 2021

(54) MOBILE HOME AND ROCKET STOVE AND VENTILATION ASSEMBLIES FOR USE THEREWITH

(71) Applicant: Xuehao Li, Vancouver (CA)

(72) Inventor: Xuehao Li, Vancouver (CA)

(73) Assignee: Xuehao Li, Vancouver (CA)

( * ) Notice: Subject to any disclaimer, the term of this patent is extended or adjusted under 35 U.S.C. 154(b) by 0 days.

(21) Appl. No.: 17/028,758

(22) Filed: Sep. 22, 2020

(65) Prior Publication Data

US 2021/0331558 A1    Oct. 28, 2021

(30) Foreign Application Priority Data

Apr. 23, 2020  (CA) ................................ CA 3079346

(51) Int. Cl.
| | |
|---|---|
| *B60H 1/22* | (2006.01) |
| *E04H 1/02* | (2006.01) |
| *B60H 1/00* | (2006.01) |
| *E04B 1/343* | (2006.01) |

(52) U.S. Cl.
CPC ....... *B60H 1/2203* (2013.01); *B60H 1/00007* (2013.01); *B60H 1/00364* (2013.01); *E04B 1/34336* (2013.01); *E04H 1/02* (2013.01)

(58) Field of Classification Search
CPC .............. B60H 1/2203; B60H 1/00007; B60H 1/00364; E04B 1/34336; E04H 1/02
See application file for complete search history.

(56) References Cited

U.S. PATENT DOCUMENTS

| | | | | |
|---|---|---|---|---|
| 2,664,808 A | * | 1/1954 | Peterson | B61D 27/009 454/105 |
| 3,162,497 A | * | 12/1964 | Boswinkle | A47B 77/16 312/248 |
| 3,970,067 A | * | 7/1976 | Vaughn | F24B 1/181 126/518 |
| 4,068,649 A | * | 1/1978 | Johnson | F24B 1/181 126/515 |
| 4,074,679 A | * | 2/1978 | Jensen | F24B 1/181 126/507 |
| 4,089,554 A | * | 5/1978 | Myers | B60N 3/16 224/498 |
| 4,184,473 A | * | 1/1980 | McIntire | F23L 3/00 126/312 |

(Continued)

*Primary Examiner* — Gisele D Ford
(74) *Attorney, Agent, or Firm* — Gowling WLG (Canada) LLP

(57) ABSTRACT

A mobile home as well as a rocket stove and ventilation assembly suitable for use therein are provided. The mobile home comprises: a housing body having a cuboid shape; and at least one pre-marked area on one or more walls of the housing body for indicating where a cutout for receiving a feature or an appliance therein is to be made. The rocket stove comprises a body containing therein: a vertical chimney for delivering heat to a stove top; a tee having at least three ends; and an elbow interposed and interconnected with the tee and the vertical chimney. One of the at least three ends is for receiving a fuel source therein and one of the at least three ends is connected to the elbow. The ventilation assembly comprises: at least two opposing air filters; and a plurality of fan units positioned side-by-side and sandwiched therebetween.

20 Claims, 13 Drawing Sheets

(56) References Cited

U.S. PATENT DOCUMENTS

| | | | | |
|---|---|---|---|---|
| 4,574,533 A * | 3/1986 | Bigelow, Jr. | ............... | E03C 1/01 |
| | | | | 52/234 |
| 4,601,509 A * | 7/1986 | Ellis, Sr. | ............... | B60P 3/0257 |
| | | | | 296/22 |
| 4,666,204 A * | 5/1987 | Reinholtz | ............... | B62D 47/02 |
| | | | | 296/178 |
| 4,699,207 A * | 10/1987 | Hanemaayer | ...... | B60H 1/00364 |
| | | | | 126/299 D |
| 5,052,311 A * | 10/1991 | Kincaid | .................. | F24B 1/181 |
| | | | | 126/500 |
| 8,499,755 B2 * | 8/2013 | Babington | ............ | F24C 15/002 |
| | | | | 126/268 |
| 10,457,189 B1 * | 10/2019 | Gaw | .......................... | B60P 3/34 |
| 10,710,491 B1 * | 7/2020 | Groover | .................... | B60P 3/34 |
| 2017/0079460 A1 * | 3/2017 | Steputis | .................. | F24B 1/26 |
| 2017/0115009 A1 * | 4/2017 | Ramphos | ............ | F24C 15/2042 |
| 2017/0290464 A1 * | 10/2017 | Hall | ........................ | F24C 15/30 |
| 2019/0050951 A1 * | 2/2019 | Goldberg | ............. | G05D 1/0276 |

* cited by examiner

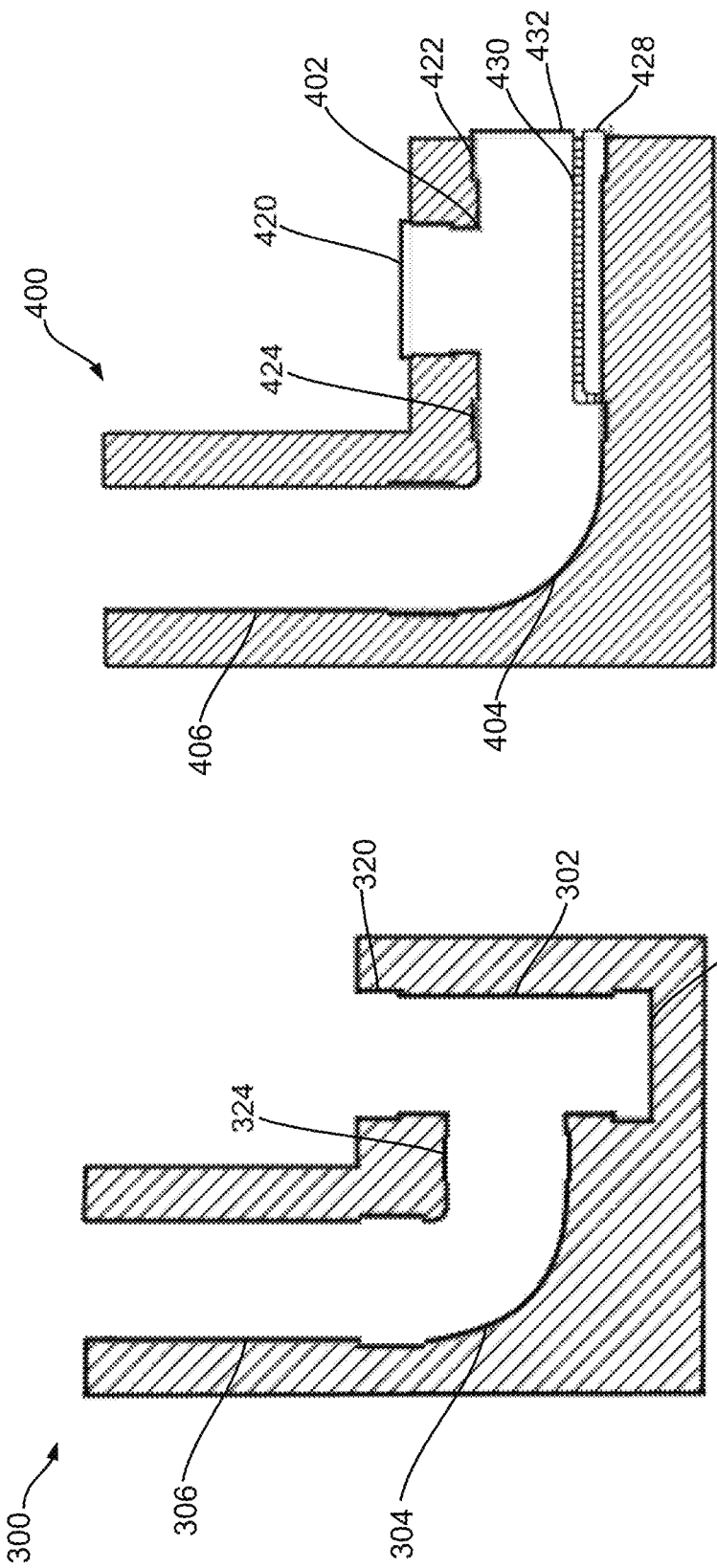

MOBILE HOME AND ROCKET STOVE AND VENTILATION ASSEMBLIES FOR USE THEREWITH

CROSS-REFERENCE TO RELATED APPLICATIONS

This application claims the benefit of Canadian Patent Application Serial No. 3,079,346, filed Apr. 23, 2020, the content of which is incorporated herein by reference in its entirety.

FIELD OF THE DISCLOSURE

The present disclosure relates generally to mobile homes and appliances for use therein. In particular, the present disclosure relates to mobile homes that are suitable for stacked bulk shipping, as well as rocket stoves and ventilation assemblies that are suitable for use therein.

BACKGROUND

Mobile homes may be constructed in a variety of configurations. For example, some mobile homes may be made of light materials without a foundation such that they may be loaded to a flatbed vehicle for transportation. While the sizes of such mobile homes may be moderate in terms of living space, the sizes may be relatively large for transportation and are therefore difficult to move between locations.

In some configurations, mobile homes may be in the form of towable or self-propelled trailers having a house-like body on a chassis with a plurality of wheels. While such mobile homes are usually easy to transport, their sizes are generally relatively small for living.

As well, in some instances, mobile homes may be made of one or more containers such as one or more standard-size steel shipping containers. Such containers may be individually constructed as a fully functional mobile home. Alternatively, a mobile home may be made of a plurality of containers wherein each container may be constructed as a section of the mobile home with a specific function.

U.S. Pat. No. 10,301,813, entitled "PORTABLE CORE FACILITY FOR A BUILDING," to Hawkins teaches a prefabricated building module constructed at a central location and delivered to a construction site via the intermodal freight transport system. The pre-fabricated building modules has cold formed wood bracing walls to resist forces in shear and uplift while providing a continuous load path to the foundation system. The module may include interior walls to section the module into rooms and further comprises mechanical, electrical, utility and plumbing features, and is capable of inspection and certification prior to delivery to the construction site. Once delivered to the side, the module is anchored to a foundation and the remainder of the house is built around the building module.

U.S. Pat. No. 8,166,715, entitled "COLLAPSIBLE MODULAR SHELTER FOR CONTAINERIZED TRANSPORTATION," to De Azambuja teaches a containerized portable shelter having expandable floor space and which is small and light enough for a helicopter to transport and which can also travel through container channels. It has a fraction (e.g. one-half) of the standard ISO width, so that a plurality of modular units can be joined to form a standard ISO container. Two or more modular units can be joined side-by-side and/or end-to-end to form a compound shipping container preferably having ISO freight container characteristics.

U.S. Pat. No. 10,287,788, entitled "MOBILE HOUSE OF AN ALUMINUM ALLOY STRUCTURE," to Kwong teaches a mobile house having an aluminum alloy structure including a C-shaped frame including a bottom frame, a side frame, and a top frame. Floor panels are mounted on the bottom frame, wallboards are mounted on the side frame, and roof panels are mounted on the top frame. The roof panels and the floor panels have an identical structure. Upper arcuate wallboards are mounted between the innermost roof panel and the uppermost wallboard. Lower arcuate wallboards are mounted between the innermost floor panel and the lowest wallboard.

While the above-described mobile homes are transportable, the transportation thereof is generally cumbersome and not efficient. In particular, such mobile homes are not suitable for stacked, bulk transportation.

Further, many aspects of mobile homes such as environmental management, power management, appliances and facilities, and/or the like, need to be designed taking into account energy efficiency, convenience, as well as required floor space.

For example, as mobile homes may offer a relatively small living space, household appliances may have to be selected or designed in order to maximize the amount square footage in the home. As well, depending on the location of the mobile home, electrical power may be expensive or difficult to access. As a result, the appliances used in mobile homes may require appliances that have a smaller footprint and that are energy efficient or capable of using energy sources other than electricity.

SUMMARY

According to one aspect of the present disclosure, there is provided a mobile home comprising: a housing body having a cuboid shape; and at least one pre-marked area on one or more walls of the housing body for indicating where a cutout for receiving a feature or an appliance of the mobile home therein is to be made.

In some embodiments, the mobile home of the present disclosure further comprises the rocket stove described herein. According to a further aspect, the mobile home of the present disclosure further comprises an external chimney connected to the rocket stove.

In some embodiments, the mobile home of the present disclosure further comprises one or more of the ventilation assemblies described herein.

In some embodiments, the housing body is a standard 40' (i.e., 40-foot) steel container.

In some embodiments, the housing body is formed of a combination of steel and wood. According to a further aspect, the housing body is shippable within a 40' shipping container.

In some embodiments, the housing body comprises corner fittings on each corner thereof.

In some embodiments, housing body is insulated with R14 to R19 type insulation. According to a further aspect, the R14 to R19 type insulation is polyurethane (PU) foam, perlite, aerogel, fiber glass, mineral wool, or any combination thereof. According to a still further aspect, the insulation is sandwiched between two or more layers of reflective film. According to a still further aspect, the two or more layers of reflective film are two or more layers of aluminum reflective film.

In some embodiments, the mobile home of the present disclosure further comprises a chassis for providing structural support to the housing body, the chassis being secured to a bottom wall of the housing body. According to a further aspect, the chassis comprises a pair of channels configured to receive forklift arms therethrough.

In some embodiments, the pre-marked area is pre-marked with paint, adhesive tape, or chalk.

In some embodiments, the mobile home of the present disclosure further comprises one or more solar panels mounted to a top wall of the housing body.

According to another aspect of the present disclosure, there is provided a rocket stove comprising: a body containing therein: a vertical chimney for delivering heat to a stove top; a tee having at least three ends; and an elbow interposed and interconnected with the tee and the vertical chimney; wherein one of the at least three ends is for receiving a fuel source therein and one of the at least three ends is connected to the elbow.

In some embodiments, one of the at least three ends extends to a position below the elbow and is for receiving ash produced by burning the fuel source. According to a further aspect, the body comprises a removable portion for collecting ash received through the third end. According to a still further aspect, the removable portion is a drawer.

In some embodiments, one of the at least three ends is configured for viewing inside the tee. According to a further aspect, the end configured for viewing inside the tee comprises a window formed of fire-resistant glass.

In some embodiments, the tee has three ends. According to another aspect, the tee has four ends.

In some embodiments, the elbow is a 90° elbow. According to a further aspect, the end for receiving the fuel source therein extends in a direction parallel to the vertical chimney. According to another further aspect, the end for receiving the fuel source therein extends in a direction perpendicular to the vertical chimney.

In some embodiments, the elbow is a 135° elbow. According to a further aspect, the end for receiving the fuel source therein extends in a direction that is 45° relative to the vertical chimney. According to a still further aspect, the end for receiving the fuel source is an extended end having a length greater than that of the other ends of the tee.

In some embodiments, the rocket stove of the present disclosure further comprises a tray positioned within the tee, the tray for supporting the fuel source thereon and comprising one or more apertures for allowing ash to fall therethrough.

In some embodiments, the body further comprises an exhaust duct. According to a further aspect, the exhaust duct extends from a lateral side of the body. According to another further aspect, the exhaust duct extends from a rear side of the body.

In some embodiments, the end for receiving the fuel source therein comprises a door. According to a further aspect, the door comprises a mesh board or a perforated board for air control.

In some embodiments, the vertical chimney comprises a tapered end, the tapered end being connected to the elbow.

In some embodiments, the vertical chimney, the tee, and the elbow comprise insulating materials on an external surface thereof. According to a further aspect, the insulating materials comprise aerogel.

According to another aspect of the present disclosure, there is provided a ventilation assembly comprising: at least two opposing air filters; and a plurality of fan units positioned side-by-side and sandwiched between the at least two opposing air filters.

In some embodiments, the at least two opposing air filters are high-efficiency particulate air (HEPA) filters.

In some embodiments, the plurality of fan units are axial-flow box fans. According to a further aspect, the axial flow box fans are CPU fans or 12-Volt fans.

In some embodiments, the plurality of fan units comprises two fan units.

In some embodiments, each of the plurality of fan units are independently operable.

In some embodiments, the plurality of fan units are reversible.

In some embodiments, the ventilation assembly further comprises one or more heat exchangers in contact with the plurality of fan units. According to a further aspect, the one or more heat exchangers are one or more ceramic heat exchangers.

In some embodiments, the at least two opposing air filters and the plurality of fan units are housed within a casing.

According to one aspect of the present disclosure, there is provided a mobile home comprising: a housing body having one or more walls; a rocket stove received in the housing body, the rocket stove being operable in a burning state and an idle state; a ventilation assembly coupled to one of the one or more walls; and a control circuitry functionally coupled to the rocket stove and the ventilation assembly. The rocket stove comprises: a vertical chimney for delivering heat to a stove top, and a tee having at least a first end for coupling to the vertical chimney via an elbow, a second for receiving a fuel source therein, and a third end. The ventilation assembly comprises: at least two opposing air filters, and a plurality of fan units positioned side-by-side and sandwiched between the at least two opposing air filters, each of the plurality of fan units being controllable for generating airflow into and out of the housing body. The control circuitry is for controlling the ventilation assembly for adjusting the airflow into the housing body based on the state of the rocket stove.

In some embodiments, the third end of the tee extends to a position below the elbow, for receiving ash produced by burning the fuel source.

In some embodiments, the rocket stove further comprises a removable structure for collecting ash received through the third end.

In some embodiments, the removable structure is a drawer.

In some embodiments, one of the second and the third ends of the tee is configured for viewing inside the tee.

In some embodiments, said one of the second and the third ends comprises a window formed of a transparent, fire-resistant material.

In some embodiments, the tee further comprises a fourth end.

In some embodiments, the elbow is a 90° elbow.

In some embodiments, the second end of the tee extends in a direction parallel to the vertical chimney.

In some embodiments, the second end of the tee extends in a direction perpendicular to the vertical chimney.

In some embodiments, the elbow is a 135° elbow.

In some embodiments, the second end of the tee extends in a direction that is 45° relative to the vertical chimney.

In some embodiments, the second end of the tee is an extended end having a length greater than that of the first and the second ends of the tee.

In some embodiments, the mobile home further comprises an ash tray positioned within the tee, the ash tray for supporting the fuel source thereon and comprising one or more apertures for allowing ash to fall therethrough.

In some embodiments, the rocket stove further comprises an exhaust duct.

In some embodiments, the exhaust duct extends from a lateral side of the rocket stove.

In some embodiments, the exhaust duct extends from a rear side of the rocket stove.

In some embodiments, the second end comprises a closable door.

In some embodiments, the closable door comprises a mesh board or a perforated board for air control.

In some embodiments, the vertical chimney comprises a tapered end coupled to the elbow.

In some embodiments, the rocket stove further comprises insulating materials coupled to external surfaces of the vertical chimney, the tee, and the elbow.

In some embodiments, the insulating materials comprise aerogel.

In some embodiments, the at least two opposing air filters of the ventilation assembly are high-efficiency particulate air (HEPA) filters.

In some embodiments, the plurality of fan units are axial-flow box fans.

In some embodiments, the axial flow box fans are CPU fans or 12-Volt fans.

In some embodiments, the plurality of fan units comprises two fan units.

In some embodiments, each of the plurality of fan units are independently operable.

In some embodiments, the plurality of fan units are reversible.

In some embodiments, the mobile home further comprises one or more heat exchangers in contact with the plurality of fan units.

In some embodiments, the one or more heat exchangers are one or more ceramic heat exchangers.

In some embodiments, the at least two opposing air filters and the plurality of fan units are housed within a casing.

In some embodiments, the housing body comprises at least one pre-marked area on one or more walls of the housing body for indicating where a cutout for receiving a feature or an appliance of the mobile home therein is to be made.

In some embodiments, the mobile home further comprises an external chimney connected to the rocket stove.

In some embodiments, the housing body is a standard 40-foot steel container.

In some embodiments, the housing body is formed of a combination of steel and wood.

In some embodiments, the housing body is shippable within a 40-foot shipping container.

In some embodiments, the housing body comprises corner fittings on each corner thereof.

In some embodiments, the housing body is insulated with R14 to R19 type insulation.

In some embodiments, the R14 to R19 type insulation is polyurethane (PU) foam, perlite, aerogel, fiber glass, mineral wool, or a combination thereof.

In some embodiments, the insulation is sandwiched between two or more layers of reflective film.

In some embodiments, the two or more layers of reflective film are two or more layers of aluminum reflective film.

In some embodiments, the mobile home further comprises a chassis for providing structural support to the housing body, the chassis secured to a bottom wall of the housing body.

In some embodiments, the chassis comprises a pair of channels configured to receive forklift arms therethrough.

In some embodiments, the pre-marked area is pre-marked with paint, adhesive tape, or chalk.

In some embodiments, the mobile home further comprises one or more solar panels mounted to a top wall of the housing body.

In some embodiments, the control circuitry is in wireless communication with the ventilation assembly.

In some embodiments, the control circuitry is in wired communication with the ventilation assembly.

In some embodiments, the mobile home further comprises one or more first sensors in communication with the control circuitry for determining the state of the rocket stove.

In some embodiments, the one or more first sensors comprises a temperature sensor associated with the rocket stove.

In some embodiments, the control circuitry is configured for determining that the rocket stove is in the burning state when the temperature sensor outputs a temperature higher than a predefined first temperature threshold.

In some embodiments, the control circuitry is configured for determining that the rocket stove is in the idle state when the temperature sensor outputs a temperature lower than a predefined second temperature threshold.

In some embodiments, the one or more first sensors comprises a light sensor associated with the rocket stove.

In some embodiments, the control circuitry is configured for determining that the rocket stove is in the burning state when the light sensor outputs a light-intensity measurement higher than a predefined first light-intensity threshold.

In some embodiments, the control circuitry is configured for determining that the rocket stove is in the idle state when the light sensor outputs a light-intensity measurement lower than a predefined second light-intensity threshold.

In some embodiments, the control circuitry is configured for instructing the ventilation assembly to operate for increasing airflow into the housing body after receiving a user input indicating that the rocket stove is in the burning state.

In some embodiments, the control circuitry is configured for instructing the ventilation assembly to operate for increasing airflow into the housing body when the rocket stove is in the burning state.

In some embodiments, the mobile home further comprises one or more second sensors in communication with the control circuitry for measuring airflow through the ventilation assembly.

In some embodiments, the mobile home further comprises one or more air-pressure sensors in communication with the control circuitry for measuring air pressure in the housing body.

In some embodiments, the control circuitry is configured for instructing the ventilation assembly to operate at a predefined speed when the rocket stove is in the burning state.

In some embodiments, the control circuitry is configured for instructing the ventilation assembly to operate at a speed determined based on the rate of air-pressure drop in the housing body.

BRIEF DESCRIPTION OF THE DRAWINGS

FIG. 12 is a cross-sectional side view of a rocket stove of the mobile home shown in FIG. 1, according to another embodiment of the present disclosure;

FIG. 13 is a cross-sectional side view of a rocket stove of the mobile home shown in FIG. 1, according to another embodiment of the present disclosure;

DETAILED DESCRIPTION

Broadly, the present disclosure relates to mobile homes and appliances suitable for use therein. In particular, the present disclosure relates to mobile homes that may be shipped in the same manner as standard shipping containers or within standard shipping containers, as well as rocket stoves and ventilation assemblies that may be installed and used therein.

The mobile homes, rocket stoves, and ventilation assemblies of the present disclosure may afford a number of advantages that will become apparent from the detailed description provided below.

Mobile Home

The present disclosure relates to mobile homes. The mobile homes of the present disclosure comprise a housing body having a cuboid shape; and at least at least one pre-marked area on one or more walls of the housing body for indicating where a cutout for receiving a feature or an appliance of the mobile home therein is to be made. The mobile homes of the present disclosure are advantageously shippable in bulk in the same manner as standard shipping containers. That is, the mobile homes may be lifted, loaded, stacked, etc. using the same systems as standard shipping containers. As will be discussed in greater detail below, this may be accomplished by, for example, forming the housing body from a standard shipping container, with the same features as standard shipping containers, or with a size so that it fits within a standard shipping container.

Figure 5:
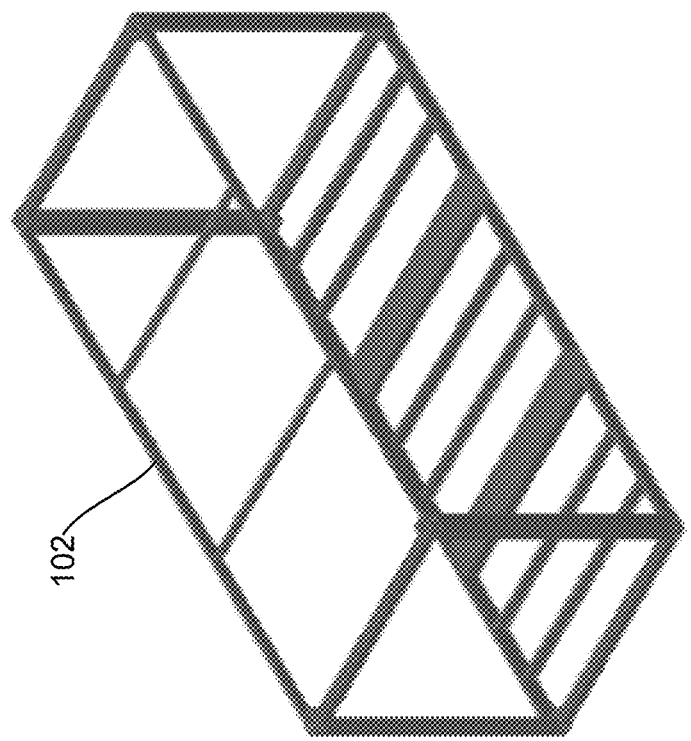
FIG. 5 is a perspective view of a housing body of the mobile home shown in FIG. 1, according to an embodiment of the present disclosure.
Figure 4:
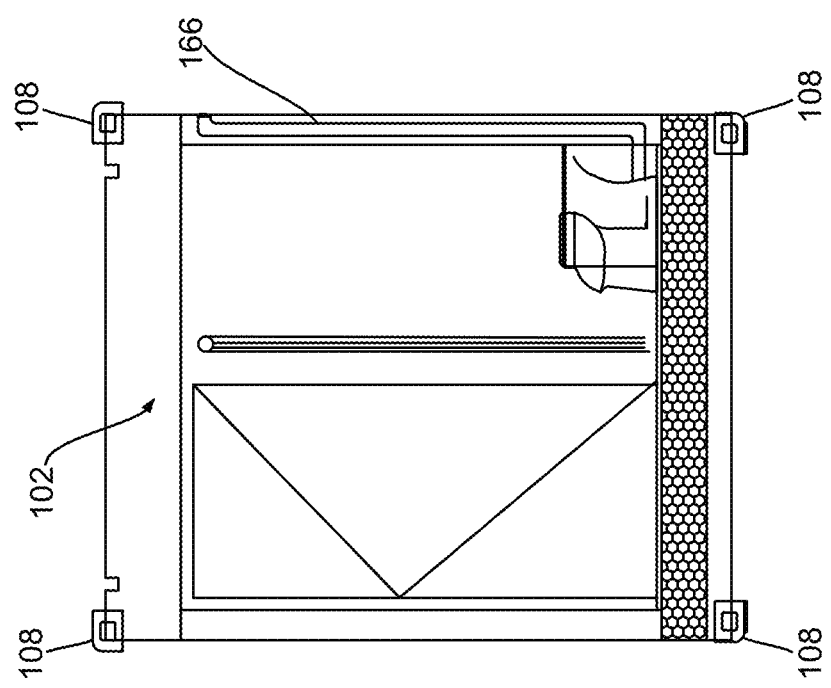
FIG. 4 is a cross-sectional view of the mobile home shown in FIG. 1 along line B-B.

Turning now to FIGS. 1 to 9, a mobile home according to some embodiments of this disclosure is shown and is generally identified using reference numeral 100. In these embodiments, the mobile home 100 has a housing body 102. According to one aspect, the housing body 102 may be formed from a repurposed cuboid container, such as a shipping container. The container may be, for example, a steel container such as a 10' (i.e., 10-foot), 20', 30', or 40' standard steel container. Alternatively, in another aspect, the housing body 102 may be custom built according to desired specifications, such as illustrated in FIG. 5. In aspects where the housing body 102 is custom built, the housing body 102 may be constructed using one or more suitable building materials such as wood, metal, etc. The custom-built housing body 102 may be sized to fit within a standard shipping container.

The housing body has a first side wall 104a, a second side wall 104b, a first end wall 104c, a second end wall 104d, a bottom wall 104e and a top wall 104f. The six walls 104a, 104b, 104c, 104d, 104e, 104f form an enclosed living space 106. The enclosed living space 106 includes a finished floor, finished ceiling, and finished walls, each of which may be finished using any suitable method. For example, the floor may finished using wood, concrete, flooring such as laminate flooring, tile, and the like, and stone. The walls and finished ceiling may be finished with one or more of wood, drywall, brick, and the like. As well, the walls 104a, 104b, 104c, 104d, 104e, 104f of the housing body 102 may have wiring and/or plumbing integrated therein for the enclosed living space 106.

Further, in embodiments where the housing body 102 is formed from a repurposed container (e.g. a shipping container), the finished floor, finished ceiling, and finished walls of the enclosed living space 106 may be installed on an inner housing frame (not shown). The inner housing frame may be formed from, for example, wood, metal, or a combination thereof. The inner housing frame may provide a surface for mounting the ceiling, floor and walls thereon, while also providing an area into which insulation materials may be installed. In an aspect, the insulation materials may be loose fill insulation, insulation batts, insulation rolls, foam board insulation, or spray foam insulation. In a particular aspect, the insulation materials may be R14 to R19 type insulation. For example and without limitation, the insulation materials may be any of aerogel, polyurethane (PU) foam, and perlite. In a further aspect, one or both sides of the insulation material may be covered with a reflective film, such as a silver or an aluminum reflective film for additional insulation. The reflective film(s) may aid in the reflection of heat radiation. In some instances, the reflective films may have a reflection rate up to 97% of the total heat radiation, and thus may significantly preserve the heat of the living space 106.

In regards to the exterior of the housing body 102, the exterior side of the walls 104a, 104b, 104c, and 104d (i.e. the vertical walls of the housing body) may be outfitted with siding or building materials such as brick, stone, or the like. The outfitting may be accomplished using any suitable technique. For example, in one aspect, the siding may be metal siding, polymer siding (e.g. vinyl), or wood siding that is fastened to the walls 104a, 104b, 104c, 104d by way of fasteners such as bolts, screws, and the like.

In regards to the top wall 104f, the exterior thereof may finished using known techniques. For example, in one aspect, the top wall 104f may be finished using wood, metal, or a polymer (e.g. ethylene propylene diene monomer rubber, PVC membrane, flexible thermopolyolefin, thermoplastic polyolefin, glass-reinforced plastic, and/or the like). In one aspect, the top wall 104*f* is configured as a roof deck, wherein the top wall 104*f* is outfitted with wood and/or another suitable material to form a deck, and a railing is installed around the perimeter of the top wall 104*f*. In another aspect, the top wall 104*f* may be configured as a green roof, wherein topsoil or other growth media is deposited and seeded on the exterior side of the wall 104*f*.

Figure 6:
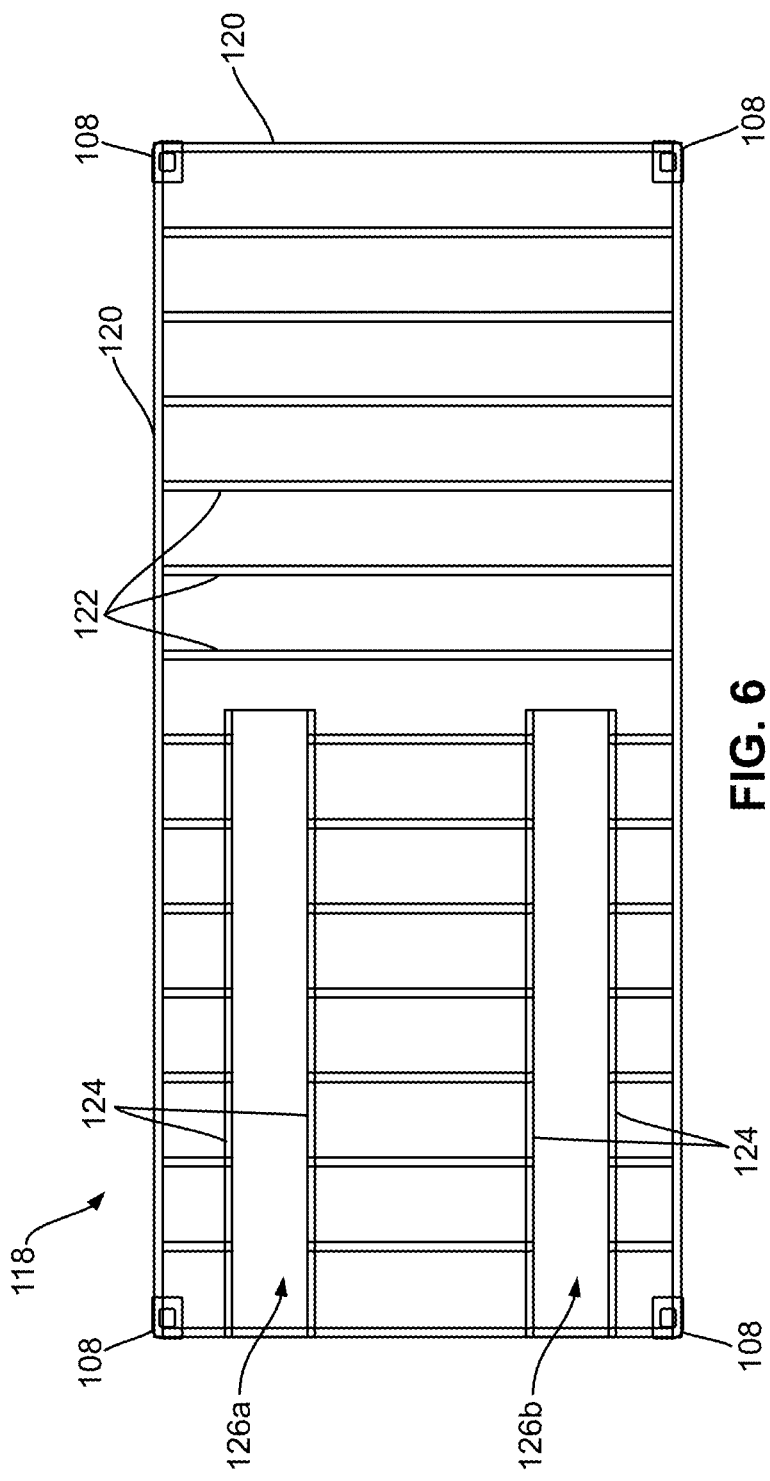
FIG. 6 is a bottom view of a chassis of the mobile home shown in FIG. 1, according to an embodiment of the present disclosure.
Figure 7:
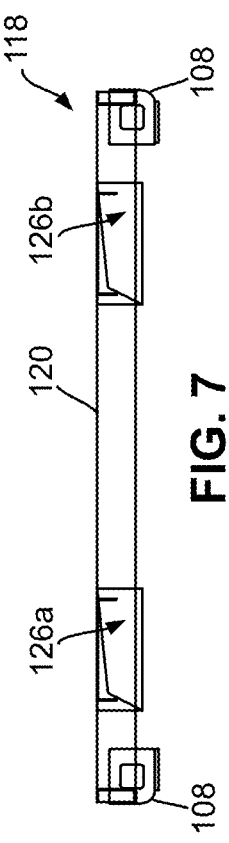
FIG. 7 is a side view of the chassis shown in FIG. 6.

Further, according to one embodiment, and as shown in FIGS. 6 and 7, the mobile home 100 may further include external reinforcement beams secured to the bottom wall 104*e*. The reinforcement beams may act as a chassis 118 for the mobile home 100. In the illustrated embodiment, the chassis 118 comprises side reinforcement beams 120, which form the perimeter thereof, and a plurality of parallel cross reinforcement beams 122 extending between opposing side reinforcement beams 120. The reinforcement beams 120, 122 may be formed, for example, of wood, metal, or a combination thereof. In one aspect, the reinforcement beams 120, 122 are steel bars welded to the bottom wall 104*e*. In another aspect, the reinforcement beams 120 and 122 are wood planks fastened to the bottom wall 104*e* by way of fasteners such as screws, bolts, or the like.

The reinforcement beams 120, 122 may provide additional, load-bearing support for the mobile home 100 so that the weight of the mobile home 100 is not solely supported by the bottom wall 104*e*. This may be accomplished by configuring the housing body 102 to rest on the reinforcement beams 120, 122 rather than directly on a below surface (e.g. the ground or a flatbed of a truck). In some aspects, the reinforcement beams 120, 122 are configured to contact the below surface. In other aspects, the reinforcement beams 120 have a height greater than that of the reinforcement beams 122 such that the only the reinforcement beams 120 are in contact with the below surface.

Further, the chassis 118 may include a pair of channels 126*a* and 126*b* for receiving forklift arms therethrough. In the illustrated embodiment, the channels 126*a*, 126*b* are defined by beams 124, which extend perpendicularity from one of the reinforcement beams 120. The beams 124 may be configured in the same manner as reinforcement beams 120, 122. As well, it is noted that the illustrated embodiment shows only a single configuration of the channels 126*a*, 126*b*, and that other configurations are possible and are contemplated. For example, the channels may extend from any of the reinforcement beams 120. As well, there may be more than one pair of channels 126*a*, 126*b*, and/or the channels 126*a*, 126*b* may span the entire width or length of the chassis 118, rather than only a portion thereof as illustrated in FIG. 6.

Further, in one aspect, the height of the beams 124 may be less than that of the reinforcement beams 120, 122 so that the beams 124 do not contact the surface on which the housing body 102 rests and thus do not bear the load of the housing body 102. Alternatively, the height of the beams 124 may be equal to that of the reinforcement beams 120, 122 so that the beams 124 may also act as load-bearing beams.

Figure 8:
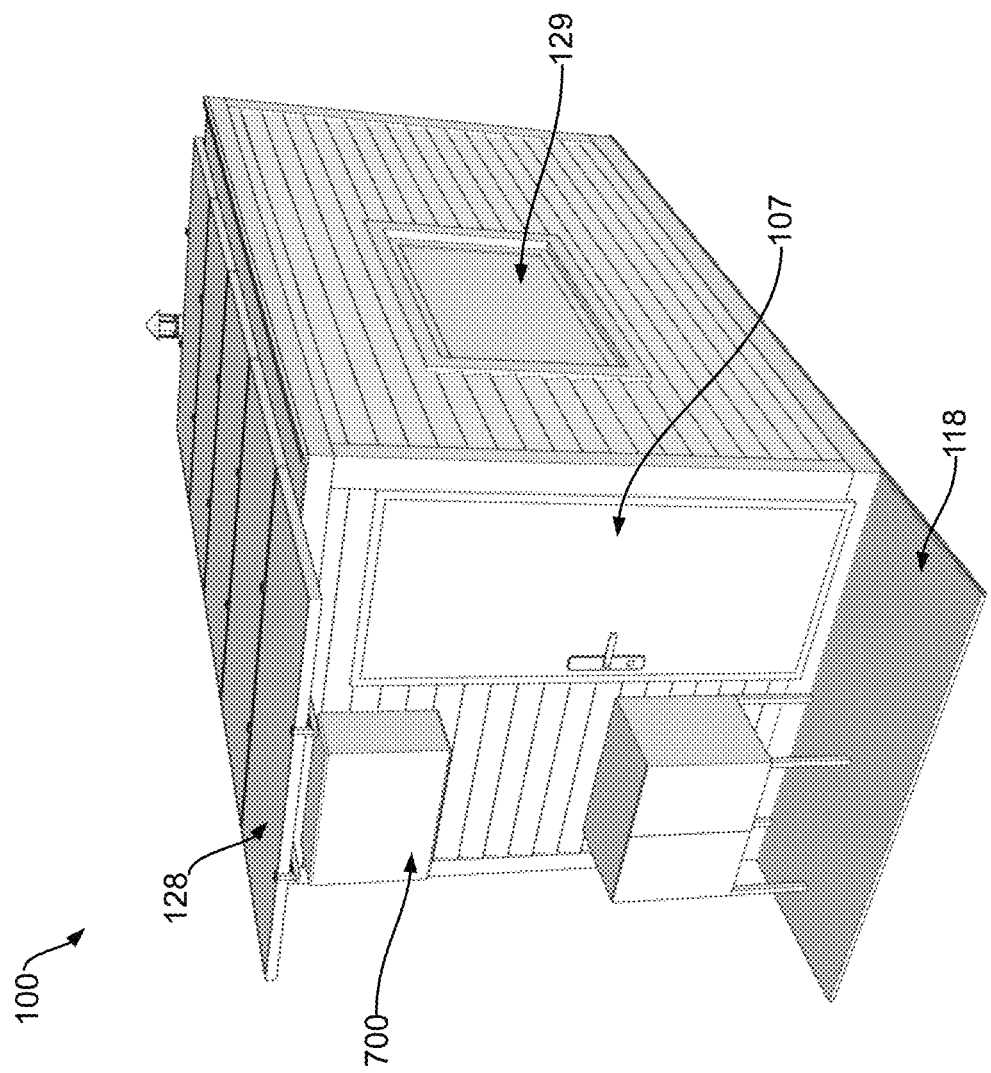
FIG. 8 is a perspective view of the mobile home shown in FIG. 1, according to an embodiment of the present disclosure.

According to a further aspect, the chassis 118 may extend beyond the perimeter of the bottom wall 104*e*. Such aspects allow for the building of a deck (e.g. a wood or vinyl deck) on the portion of the chassis 118 that extends beyond the bottom wall 104*e*, as illustrated in FIG. 8. In a yet further aspect, the side reinforcement beams 120 may be visible when the mobile house 100 is installed at a location and configured to have the appearance of house skirting.

Further, as will be appreciated, the housing body 102 has eight corners, with each corner formed at a point where three walls meet. According to one embodiment, the housing body 102 may comprise corner fittings 108 at each of the eight corners. According to one aspect, the corner fittings 108 may be corner castings, lifting lugs, or the like. In a particular aspect, the corner fittings 108 comply with international shipping standards so that the mobile home 100 may lifted, stacked, and shipped (e.g. via land transportation or ocean shipping) in the same manner as a standard shipping container. The corner fittings 108 may be formed of a suitable metal, such as stainless steel. For installation, the corner fittings 108 may be positioned over the corners of the mobile house 100 and then attached thereto (e.g. by welding).

The corner fittings 108 may serve a number of purposes. In one aspect, the corner fittings may serve to protect the corners and walls of the housing body 102 (e.g. during shipping). In more detail, the corner fittings 108 are configured to receive a corner of the housing body 102 therein in order to act as a protective shell. As well, the corner fittings 108 may serve to space each of the walls 104*a*, 104*b*, 104*c*, 104*d*, 104*e*, 104*f* away from adjacent surfaces, thereby reducing damage caused by contact of the walls 104*a*, 104*b*, 104*c*, 104*d*, 104*e*, 104*f* with the adjacent surfaces. For example, the corner fittings 108 may act to space the bottom wall 104*e* away from the flatbed of a transport truck, a top wall 104*f* of another mobile home 100, or the ground. Additionally, the corner fittings 108 may serve to facilitate the transport of the mobile house 100. Each corner fitting 108 may have a through hole for receiving a hook from lifting equipment (not shown) therethrough to facilitate the lifting and lowering of the mobile house 100 during transport.

Further, it is noted that, in embodiments where the chassis 118 is present, the reinforcement beams 120 may be configured to extend between the corner fittings 108 located at the corners of the bottom wall 104*e*. Alternatively, the corner fittings 108 may be fit onto the corners of the chassis 118. As well, the reinforcement beams 120 and 122 may be configured to have a height such that bottom surfaces of reinforcement beams 120 and 122 are at the same level as those of the corner fittings 108. Alternatively, the bottom surfaces of the corner fittings 108 may be lower than those of the reinforcement beams 120 and 122, such as illustrated in FIG. 7. In such configurations, the corner fittings 108 may be load bearing, while the chassis 118 provides additional structural support.

Additionally, in some embodiments, the mobile home 100 includes one or more means for capturing alternative energy sources. For example, as shown in FIG. 8, in one aspect, the mobile home 100 may include a solar panel 128 attached to an external side of the top wall 104*f* for converting solar energy to electricity and/or heat. The solar panels may be selected to fit within the perimeter of the top wall 104*f* or may instead be mounted on the top wall 104*f* such that they extend beyond the perimeter of the top wall 104*f* in order to form an overhang, as shown in FIG. 8. In a further aspect, the mobile home 100 may be outfitted with an adaptor for operably mounting a wind turbine (e.g. a vertical axis wind turbine; not shown) thereon. In embodiments where means for capturing alternative energy sources are provided, the electrical power generated may be fed directly into the mobile home 100 for immediate use or may instead be stored in a battery (not shown) for later use. Suitable batteries are known to those of ordinary skill in the art.

In regards to the features of the mobile home 100, housing body 102 has an entrance formed in the wall 104*d* for entering the living space 106. Of course, as will be appreciated, the entrance may be on any of the vertical walls 104a, 104b, 104c, and 104d. A door 107 is hingedly connected to an end of the entrance for restricting or allowing access to the living space 106 by way of the entrance. In other configurations, the door 107 is a sliding door that is slidably connected to a wall of the housing body 102 that includes the entrance. However, as will be appreciated, the door may be configured in any manner known in the art. In one aspect, the door 107 may be a customized solid steel safety door.

The mobile home 100 may also have at least one cutout formed in the walls 104a, 104b, 104c, and/or 104d for receiving one or more windows 129. The window (s) 129 may be any size and any type. For example, and without limitation, the window(s) 129 may be commercially available double or triple layer windows for reducing heat loss from the living space 106. As well, the window(s) 129 may comprise glass that is tempered or explosion-proof. The glass may also be coated with silver in order to have high reflectivity and transparency. The space between layers of glass may also be filled with insulation material, such as aerogel.

Figure 1:
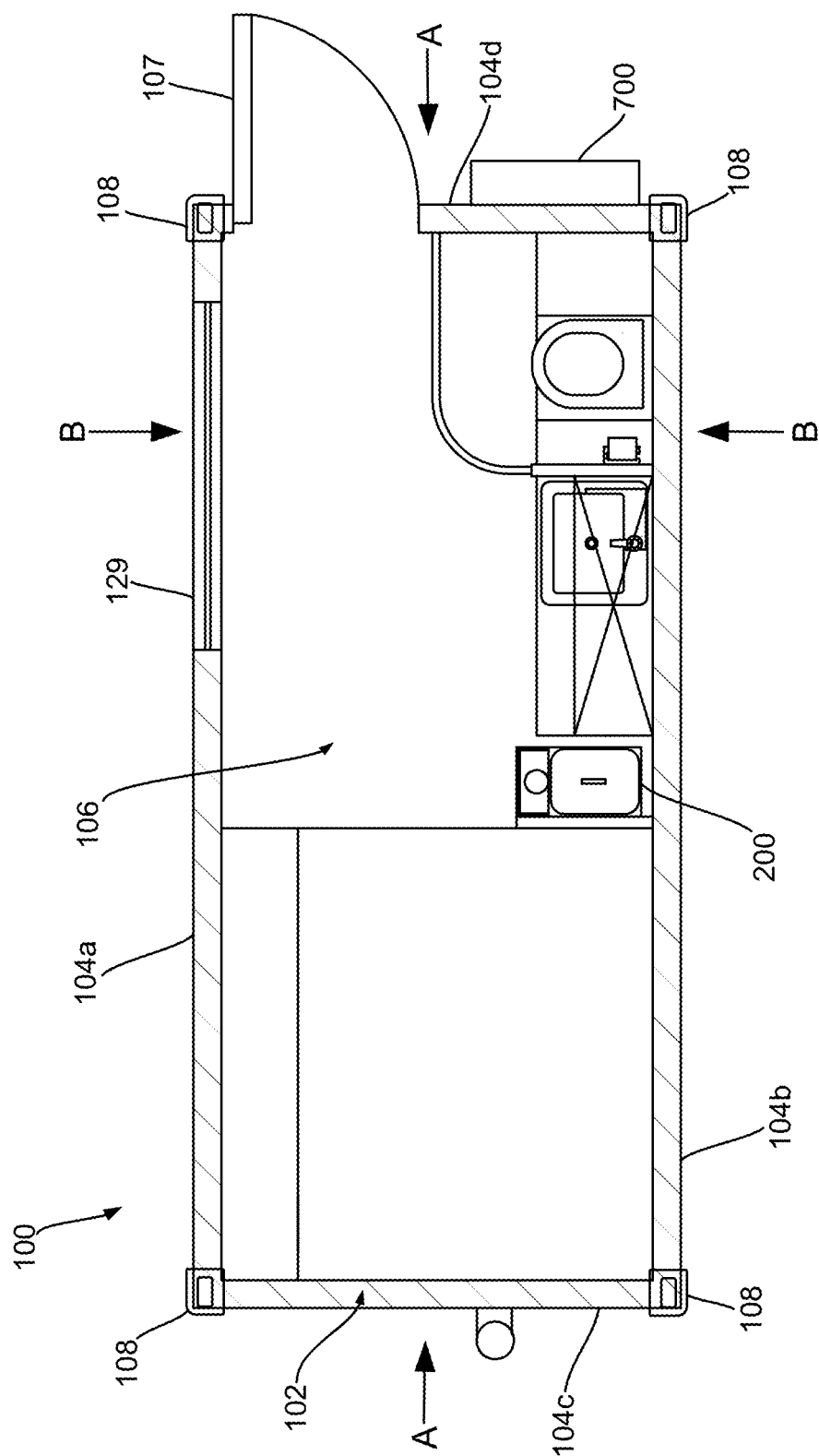
FIG. 1 is a top plan view of a mobile home, according to an embodiment of this disclosure.
Figure 2:
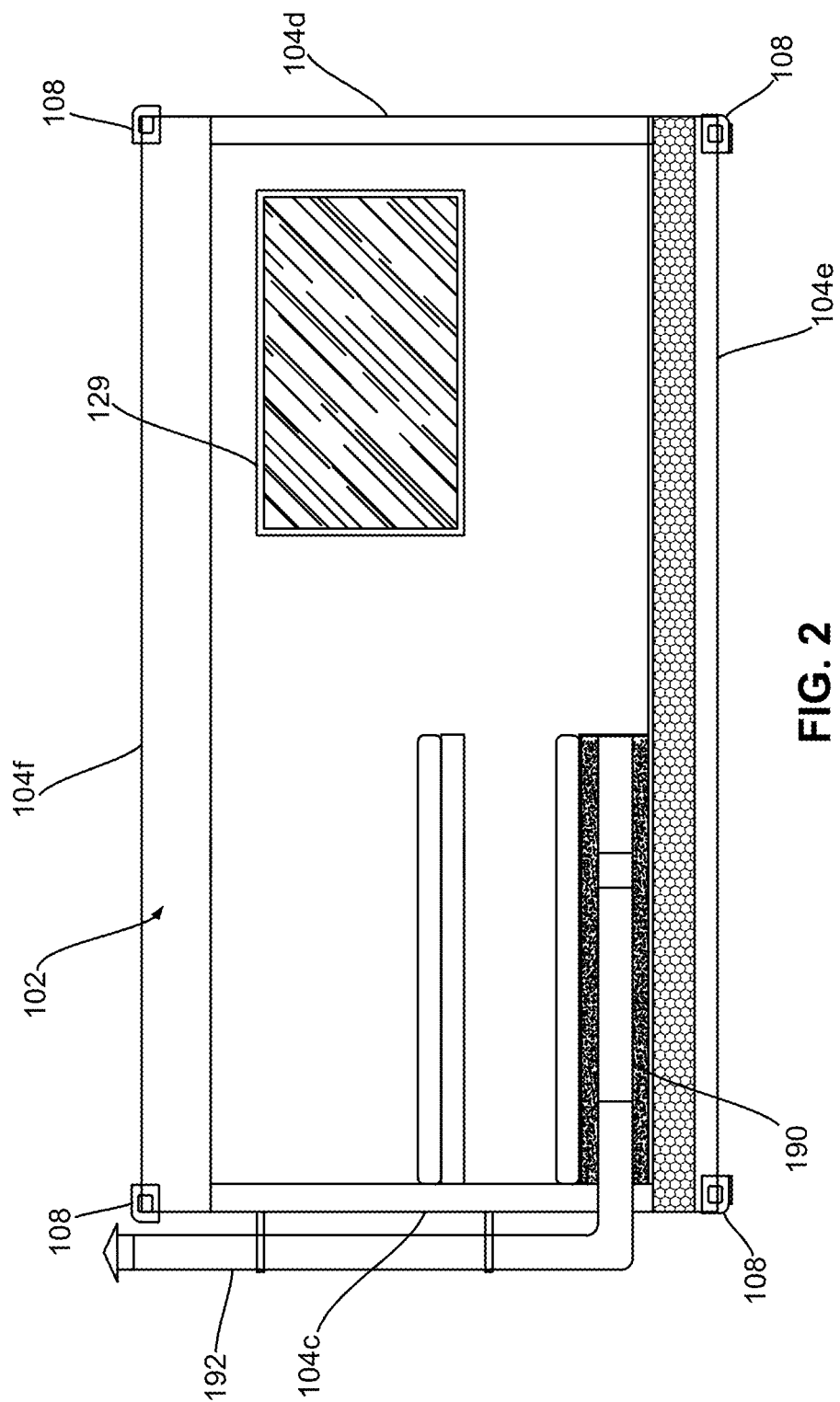
FIG. 2 is a cross-sectional view the mobile home shown in FIG. 1 along line A-A.
Figure 3:
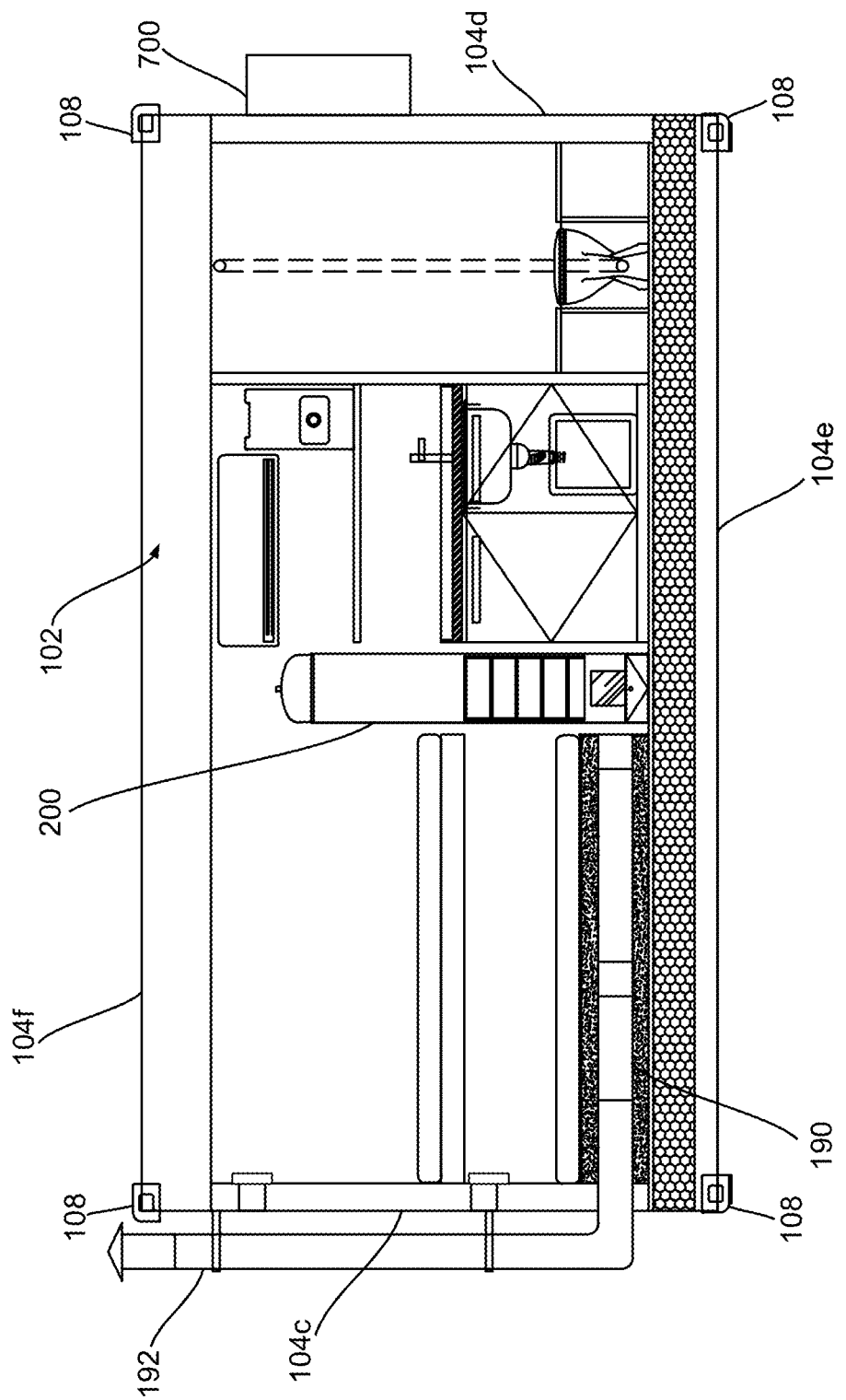
FIG. 3 is another cross-sectional view of the mobile home shown in FIG. 1 along line A-A.

The mobile home 100 may include a variety of appliances and/or facilities in the enclosed living space 106. For example, the enclosed living space 106 may comprise living facilities such as one or more beds, a toilet, a water tank, an air conditioner, heating equipment, ventilation assemblies, cooking equipment, and the like. The wiring and/or plumbing required to use the appliances and facilities may be integrated into the housing body 102 in order to facilitate easy installation at a site. One arrangement of the living space 106 is shown in FIGS. 1 to 3, wherein the living space 106 includes at least one bed. The bed may be a single bed or a bunk bed. For example, in some embodiments, the living space 106 includes one or more bunk beds with the frames of the beds mounted to or otherwise integrated with the frame of the housing body 102.

The living space 106 also includes a washroom area having a toilet. The washroom area may be contained within a partitioned area defined by a partition panel within the living space 106. The partition panel 162 may comprise construction panels, industrial modular panels, or the like. As well, the washroom area may include means for ventilating the air therewithin. For example, in FIG. 4, a channel 166 is formed in portion of a wall of the housing body 102. The channel 166 facilitates removal of air to outside the living space 106 as well as the introduction of outside air. The channel 166 may comprise a hollow tube embedded within the wall of the housing body 102. Means for facilitating the movement of the air (e.g. a ventilation assembly 700 described below) may also be included in the channel 166.

The living space 106 may also have a kitchen area. The kitchen area includes, for example, cooking means, a water tank, a counter top, a sink, a faucet, storage space, etc. The cooking means may be a stove, a hotplate, or the like. In the illustrated embodiment, the cooking means comprises a rocket stove 200, described in more detail below. The kitchen area may also include an exhaust system (e.g. exhaust duct 190) for removing any smoke or fumes produced by the cooking means to outside of the mobile home 100.

Further, in light of the above, it will be appreciated that the housing body 102 of the mobile home 100 may include a number of features and/or appliances that require a cutout in one or more of the walls 104a, 104b, 104c, 104d, 104e, 104f. For example, features of the mobile home such as the window 129, and appliances such as air conditioners, ventilation assemblies, and cooking equipment may require one or more cutouts in the walls 104a, 104b, 104c, 104d, 104e, and/or 104f. As previously described herein, the mobile homes 100 may be stacked during shipping. In order to maintain the structural integrity of the housing bodies 102 of the mobile homes 100 when stacked, the cutouts required for the various features and/or appliances of the mobile home 100 may be made after delivery to the site where the mobile home 100 is to be installed. To facilitate the cutting of the cutouts when the mobile home 100 is delivered to a site, the walls 104a, 104b, 104c, 104d, 104e, 104f are pre-marked at the areas where the cutouts are to be formed. The pre-marked areas may allow for the quick formation the cutouts and subsequent installation of the features and/or appliances therein. The areas may be pre-marked using paint, adhesive tape, chalk, or the like.

Figure 9:
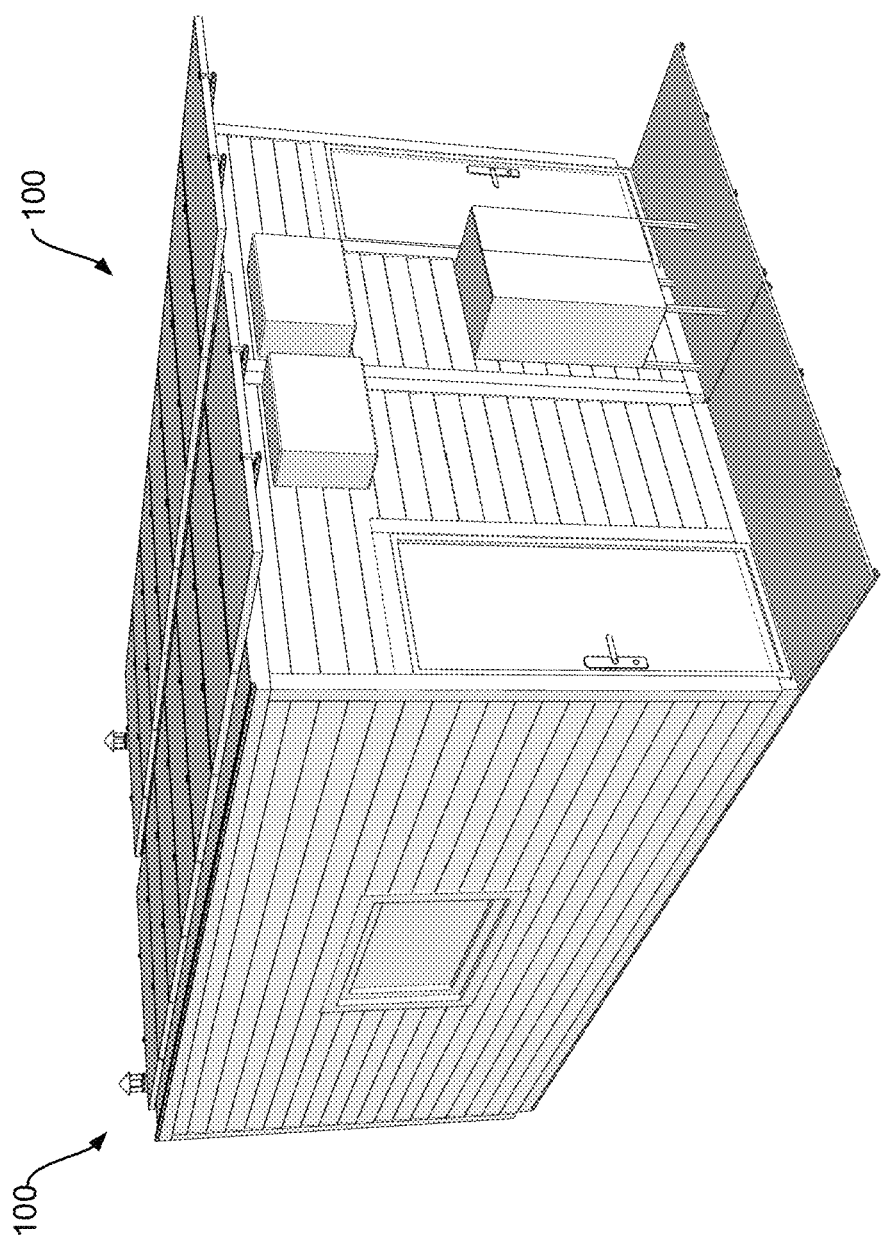
FIG. 9 is a perspective view of a mobile home shown in FIG. 1, according to an embodiment of the present disclosure.

Furthermore, the mobile homes of the present disclosure may conveniently be stacked next to each other to form a mobile complex. This may be advantageous when installing a number of mobile homes on a site that has limited space for building. Referring to FIG. 9, two mobile homes 100 have been installed at a site in a manner such that the wall of one mobile home 100 abuts the wall of the other mobile home 100.

Rocket Stove

The present disclosure also relates to a rocket stove suitable for use in a mobile home. The rocket stoves of the present disclosure comprise: a body containing therein: a vertical chimney for delivering heat to a stove top; a tee having at least three ends; and an elbow interposed and interconnected with the tee and the vertical chimney; wherein one of the at least three ends is for receiving a fuel source therein and one of the at least three ends is connected to the elbow. During operation, a fuel source is burned within the tee, and heat is delivered through the elbow and vertical chimney to a stovetop located above the vertical chimney. Advantageously, and particularly in the context of mobile homes, the rocket stoves of the present disclosure may be used both as a cooking appliance and as a source of heat that does not require electricity. The rocket stove may have a variety of configurations that will be discussed in greater detail below, with reference to FIGS. 10 to 15.

Figure 11:
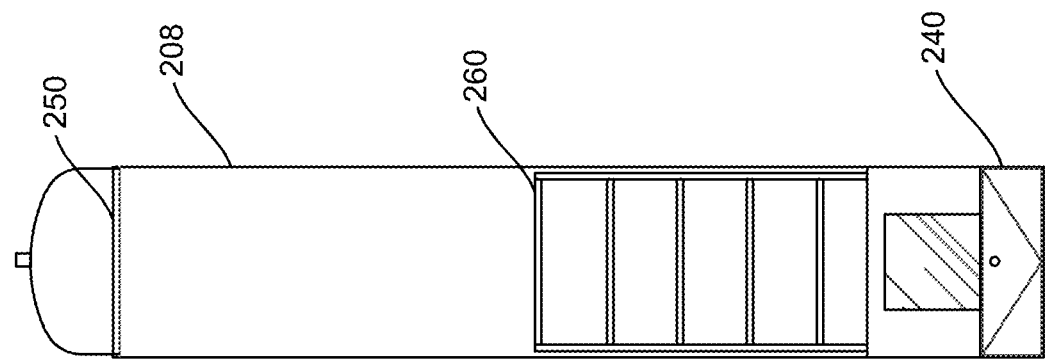
FIG. 11 is a front view of the rocket stove shown in FIG. 10.
Figure 10:
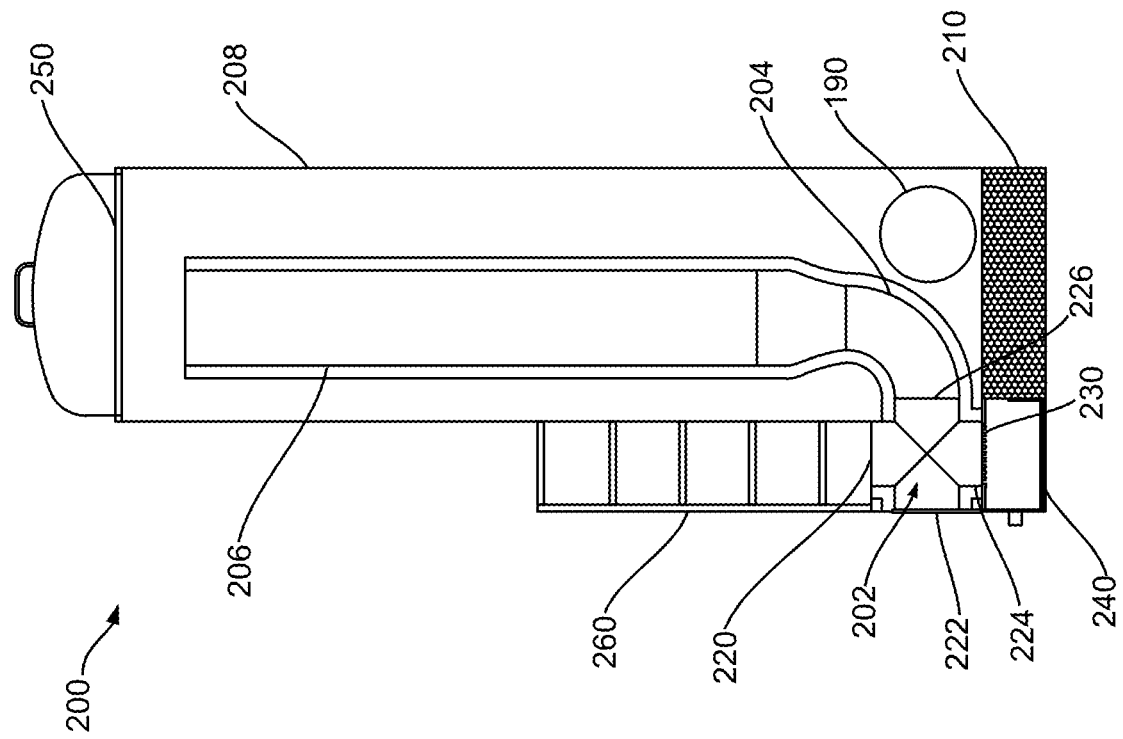
FIG. 10 is a cross-sectional side view of a rocket stove of the mobile home shown in FIG. 1, according to an embodiment of the present disclosure.

One embodiment of a rocket stove of the present disclosure is illustrated in FIGS. 10 and 11, which show a rocket stove 200 comprising a tee 202, an elbow 204, and a vertical chimney 206, each located within a body 208.

The body of 208 is formed of one or more suitable materials such as metal, brick, and the like. In a further aspect, the body 208 is a hollow body, such as in the embodiment illustrated in FIGS. 10 and 11, comprising an enclosed, sealed space. In another aspect, the body 208 is a partially hollow body. In such aspects, the tee 202, the elbow 204, and the vertical chimney 206 are secured therein in order to remain in place. The hollow body may be filled with insulating materials, such as fiber insulation, fire bricks, and the like. Alternatively, the hollow body may be left unfilled, and insulation may instead applied to the tee 202, the elbow 204, and the vertical chimney 206. In such aspects, each of the tee 202, the elbow 204, and the vertical chimney 206 may be covered with an insulating material such as fiber insulation, aerogel, and/or the like. In a particular aspect, the tee 202, the elbow 204, and the vertical chimney 206 are coated with a layer of silica aerogel having a thickness of about 20 mm.

The body 203 comprises a stovetop 250 for cooking, boiling water, and the like. The stovetop 250 is an upper surface of the body 208 that is located immediately above a top end of the vertical chimney 206. In operation, heat produced from the burning of a fuel source is delivered via the tee 202, the elbow 204, and the vertical chimney 206 to the stovetop 250 in order to heat an object placed thereon. The stovetop 250 is formed of a conductive material such as a metal (e.g. stainless steel) or a glass-ceramic.

According to one aspect, the body 208 comprises an exhaust duct 190 for directing smoke and/or fumes produced by the burning of the fuel source away from the rocket stove 200 to an external environment. Smoke and/or fumes are directed through the tee 202, the elbow 204, and the vertical chimney 206 to the bottom of the stovetop 250. However, the smoke, as well as any other exhaust, cannot pass through the stovetop 250. The exhaust duct 190 provides a path for the smoke to escape to an external environment, rather than collecting in the vertical chimney 206 and/or body 208. For example, in the context of mobile homes such as the mobile home 100, the exhaust duct 190 may extend outside of the home, to direct the smoke outside. According to one aspect, the exhaust duct 190 is formed of a metal such as stainless steel.

According an additional aspect, also in the context of the mobile home 100 previously described herein, the exhaust duct 190 may extend underneath furniture in the living space 106, as shown in FIGS. 2 and 3. In such configurations, the exhaust duct 190 may be enclosed within an insulated box. The insulated box may comprise loose fill insulation, such as sand, in order to restrict the flow of heat from the exhaust duct 190. The insulated box itself may be formed of a building material such as wood, metal, or a combination thereof. Alternatively, the exhaust duct 190 may extend through a portion of a wall of the housing body 102 that is immediately behind the rocket stove 200.

According to a further aspect, the exhaust duct 190 may attach to an external chimney 192, as illustrated in FIGS. 2 and 3. The external chimney may direct and release the smoke and/or other exhaust above, for example, the mobile home 100.

It is noted that, while the exhaust duct 190 is shown to be located on a lateral side of the rocket stove 200, the exhaust duct 190 may also be located at, for example, the rear side of the of the rocket stove 200. As well, the exhaust duct 190 shown is located proximal the bottom of the rocket stove. However, as will be discussed below, the exhaust duct may be located at any height on the rocket stove 200.

In a further aspect, the body 208 may comprise a base portion 210 that is comprised of or filled with an insulating material. The insulating material may be one or more of fiber insulation, aerogel, firebricks, or the like. The base portion 210 may be partitioned from the remainder of the body 208, such as illustrated in FIG. 10. Alternatively, for example when the body is a hollow body, the insulating materials may be positioned at the bottom thereof.

The tee 202 is located at generally within a bottom portion of the body 208. The tee 202 comprises four ends, namely, a first end 220, a second end 222, a third end 224, and a fourth end 226. It is noted that, while the tee 202 comprises four ends, other configurations are possible and are contemplated. For example, the tee 202 may comprise three ends, as will be discussed below. According to one aspect, the tee 202 may be vertically oriented such that the first end 220 and the third end 224 extend in a direction parallel to that of the vertical chimney 206, as illustrated in FIG. 10. According to another aspect, the tee 202 may be horizontally oriented such that the each of the ends 220, 222, 224, 226 extend perpendicularly relative to the vertical chimney 206.

According to one aspect, the first end 220 of the tee 202 may be configured for receiving a fuel source therein. The fuel source may be a solid fuel source such as wood, firelogs, pellets, and the like. Further, in such aspects, the first end 220 may comprise a door (not shown) for selectively allowing access thereto. The door is moveable between an open position and a closed position, for example, by way of one or more hinges or by sliding. As well, the door may be insulated using known techniques in order to reduce the escape of heat during operation. In a particular aspect, the door may comprise a mesh board or a perforated board for controlling the airflow into the tee 202. In another aspect, the door may comprise an air control valve located on a surface thereof for controlling the airflow into the tee 202. The air control valve may be any suitable valve known in the art.

According to a yet further aspect, the second end 222 may comprise a window for viewing inside the tee 202. The window may be formed of fire-resistant glass. As well, in some aspects, the window may comprise a plurality of layers of fire-resistant glass. In such aspects, the window may comprise an insulating material (e.g. aerogel) between the layers of glass. The window may be installed in the second end 222 using any suitable techniques.

It is noted that, in other aspects, the second end 222 is configured for receiving the fuel source therein, while the first end 220 comprises the window for viewing inside the tee 202.

The third end 224 of the tee 202, e.g. when in the vertical orientation, extends to a position lower than that of the elbow 204. In such configurations, the third end 224 may be configured for receiving ashes formed by the burning of the fuel source. According to one aspect, the third end 224 comprises a tray 230 secured therein for supporting the fuel source. In a further aspect, the tray 230 may be configured as a removable dish. In such aspects, the dish may collect the ash and be removed once full. According to an alternative aspect, the tray 230 may comprise a plurality of apertures for allowing ash produced by the burning of the fuel source to fall therethrough. As shown in FIGS. 10 and 11, the rocket stove may further comprise a removable ash collector 240 located below the tray 230 (e.g. in the base portion 210 of the rocket stove 200). The ash collector 240 may be in the form of a drawer located in the body 208 below the tray 230 and third end 226. The drawer is configured to be removable so that it may be emptied once full.

The fourth end 226 of the tee 202 may be configured for connection to the elbow 204. The elbow has a first end that is connected to the fourth end 226 of the tee 202 and a second end that is connected to the vertical chimney 206. The connection to the tee 202 and the chimney 206 may be accomplished using any suitable method (e.g. welding). In some aspects, the elbow 204 is formed integrally with one or more of the tee 202 and chimney 206. As well, it is noted that, in FIGS. 10 and 11 the elbow is a 90° curved elbow. However, as will be discussed in more detail below, other angles are possible.

The vertical chimney 206 extends vertically within the body 208 of the rocket stove 200. As discussed above, the vertical chimney 206 delivers heat produced by the burning of the fuel source in the tee 202 to the stovetop 250, which may then be used to cook, boil water, etc. The vertical chimney 206 is connected to the elbow 204 at a first end. The vertical chimney 206 and the elbow 204 may have the same diameter or may have different diameters. In the embodiment illustrated in FIGS. 10 and 11, the chimney 206 has a diameter greater than that of the elbow 204 and the end of the chimney 206 that is connected to the elbow 204 is a tapered end to facilitate the difference in diameter between the elbow 204 and the chimney 206. It is noted that the chimney having a larger diameter may advantageously facilitate the even heating of a large stovetop 250.

As shown in FIGS. 10 and 11, a top end of the vertical chimney 206 (i.e. the end opposite that connected to the elbow 204) is spaced away from the stovetop 250. The spacing away of the top end of the vertical chimney 206 allows any smoke produced from the burning of the fuel source to escape from the vertical chimney 206 (e.g. to the exhaust duct 190 previously discussed herein). According to one aspect, the top end of the vertical chimney 206 is spaced 0.5 inches to 6 inches away from the stovetop 250.

Further, in aspects where the first end 220 is configured for receiving the fuel source, the rocket stove 200 may comprise a safety structure 260 for restricting access to the tee 202 during operation of the rocket stove 200. The safety structure 260 is removable so that the fuel source may be delivered to the tee 202 with relative ease. Once positioned over the first end 220, the safety structure 260 may make it more difficult for, for example, a child or an animal to touch or access the inside of the tee 202 during use. In the illustrated embodiment, the safety structure 260 is a safety fence comprising a plurality of vertical bars and a plurality of horizontal bars extending therebetween. Of course, those of ordinary skill in the art understand that other types of structures are possible. For example, the safety structure 260 may be a screen or bars formed from a heat-resistant material. In some aspects, the safety structure 260 may comprise one or more shelves. The shelves may be configured to, for example, keep cooked food warm during operation of the rocket stove 200.

As indicated above, the embodiment illustrated in FIGS. 10 and 11 represents only one configuration of rocket stove. Other configurations are possible and are contemplated. For example, FIGS. 12 to 15 illustrate a rocket stove comprising a tee having three ends.

In more detail, FIG. 12 shows a rocket stove 300 comprising a tee 302, an elbow 304 and a vertical chimney 306. The tee 302 comprises a first end 320, a second end 322, and a third end 324. The rocket stove 300 may be configured in the same manner as the stove 200 previously described herein. However, the first end 320 may be configured for receiving the fuel source as well as for viewing inside the tee 302. That is, in one aspect, the first end 320 may comprise a door that is formed of a heat-resistant glass for selectively accessing the inside of the tee 302. As well, it is noted that the second end 322 may be configured as described above in relation to the third end 224.

The embodiment illustrated in FIG. 13 shows a rocket stove 400 comprising a tee 402, an elbow 404, and a vertical chimney 406. The tee 402 comprises a first end 420, a second end 422, and a third end 424. In this embodiment, the second end 422 is configured for receiving the fuel source and the first end 420 is configured for viewing inside the tee 402. However, as will be appreciated, the first end may also be configured to receive the fuel source. In the illustrated embodiment, there is no end of the tee 402 that extends below the elbow 404 for receiving ash produced by the burning of the fuel source. As a result, a tray 430 is included in the tee 402. The tray 430 comprises a plurality of apertures on a surface that that is elevated from an internal horizontal surface of the tee 402 by way of, for example, a plurality of legs and/or walls. The tray 430 acts to elevate the fuel source above the internal horizontal surface of the tee 402 so that any ash produced may fall below any remaining fuel source, thereby reducing the potential of the ash interfering with any remaining fire, embers, etc.

Further, in the embodiment illustrated in FIG. 13, the second end 422 is outfitted with a two-part door for accessing the tee 402. An upper door 432 allows for the delivery of the fuel source to a top surface of the tray 430 in the tee 402. A lower door 428 allows access to below the tray 430 without opening the upper door 432. The lower door 428 may be used, for example, to collect ash from below the fuel source and/or to control the airflow into the tee 402. The upper door 432 and the lower door 428 may be independently configured as described above in relation to doors of the rocket stoves 200 and 300 described above.

Figure 15:
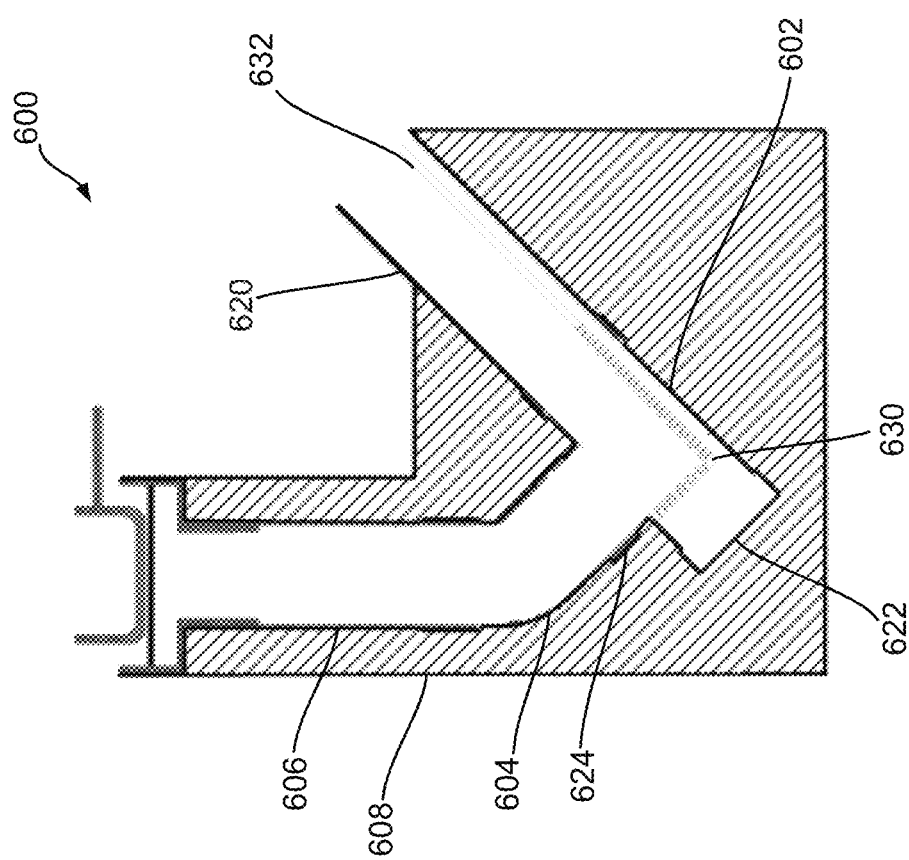
FIG. 15 a is a cross-sectional side view of a rocket stove of the mobile home shown in FIG. 1, according to another embodiment of the present disclosure.

The embodiment illustrated in FIG. 15 shows a rocket stove 600 comprising a tee 602, a 135° elbow 604, and a vertical chimney 606. The tee 602 comprises a first extended end 620, a second end 622, and a third end 624. The first extended end 620 may be formed of one piece or two pieces that have be secured together. For example, the tee 602 may have been formed integrally as one piece or instead may have had an additional pipe secured to the first end 620 (e.g. by welding) in order to extend the end. As well, it is noted that the first extended end may extend outside of the body 608 of the rocket stove 600, as illustrated in FIG. 15. As well, the extended end 620 extends in a direction that is 45° relative to the vertical chimney 606.

Further, in embodiment shown in FIG. 15, the second end 622 extends below the elbow 604 and may be configured to receive ash produced by the burning of the fuel source. The second end 622 may be configured as described above (e.g. configured to deposit ash into a removable drawer).

The rocket stove 600 comprises a tray 630. The tray 630 may be configured to hold the fuel source and to allow ash to fall through (e.g. in the manners described above) to the second end 622. Alternatively, for example, when the second end 622 does not direct the ash to a removable drawer, the tray 630 may be configured to hold both the fuel source and ash thereon. The tray may be configured to hold the fuel source in the manner illustrated in FIG. 15. That is, the tray 630 may comprise an upper portion and a bottom portion connected perpendicularly thereto. Such configurations may allow the tray 630 to hold the fuel source against the slope formed by the tee 602 when connected to the 135° elbow 604. As well, an elongated handle 632 may be attached to the tray 630 to facilitate lowering and raising the tray 630 into and out of the tee 602.

Figure 14:
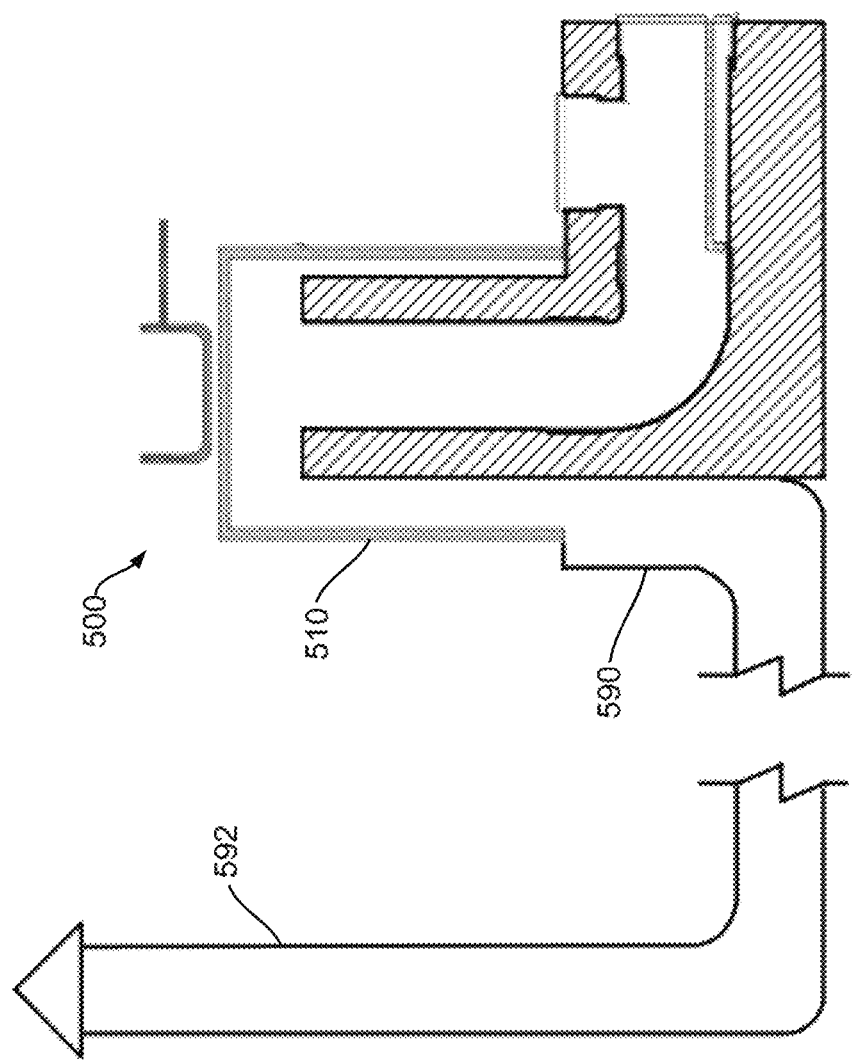
FIG. 14 is a cross-sectional side view of a rocket stove of the mobile home shown in FIG. 1, according to another embodiment of the present disclosure.

In FIG. 14 there is illustrated an alternative embodiment wherein a rocket stove 500 is configured to have an exhaust duct 590 extend from an upper portion of a rear side 510. As well, it is again shown that the exhaust duct 590 may connect to an external chimney 592 for releasing smoke and other exhaust into an outside environment.

As will be appreciated, while the rocket stoves of the present disclosure have been described in the context of mobile homes, the rocket stoves may be suitable for use in all types of homes or structures, as well as outdoors.

Ventilation Assembly

The present disclosure also relates to ventilation assemblies suitable for use in structures such as the mobile home 100 discussed above. The ventilation assemblies of the present disclosure comprise at least two opposing air filters; and a plurality of fan units positioned side-by-side and sandwiched between the at least two opposing air filters. The ventilation assemblies are capable of drawing external air into the structures as well as drawing air out of the structures and into an external environment. As a result, the ventilation assemblies of the present disclosure are advantageously capable of selectively creating or removing a positive pressure in the structure. Herein, a positive pressure in the structure means that the air pressure in the structure is higher than that outside the structure (which is generally the atmospheric pressure).

The ventilation assemblies of the present disclosure are advantageously configured such that the fan units driving the flow of air are protected from build-up of dust or other particulate matter thereon. In some embodiments, the mobile home 100 may further comprise a control circuitry for monitoring the pressure inside the mobile home 100 and controlling the ventilation assemblies for maintaining sufficient airflow into the mobile home 100 when the rocket stove 200 is in operation.

Figure 16:
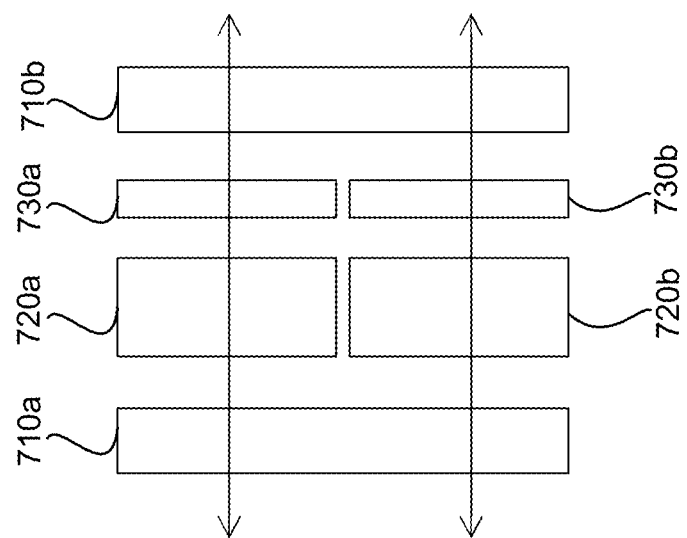
FIG. 16 is a schematic view of a ventilation assembly of the mobile home shown in FIG. 1, according to an embodiment of the present disclosure.

The ventilation assemblies of the present disclosure are sandwiched in that the plurality of fan units are positioned between the at least two opposing filters. That is, each of the plurality of fan units conveys air through two filters. In more detail, each of the plurality of fan units pulls air through a first filter and pushes the air through a second filter. Referring now to FIG. 16, there is illustrated an example ventilation assembly 700 of the present disclosure. The ventilation assembly 700 comprises at least two opposing filters 710a, 710b, and a plurality of fan units 720a, 720b. The bi-directional arrows indicate that air may be selectively conveyed through the ventilation assembly 700 in either direction.

According to a first aspect, the at least two opposing filters 710a, 710b are high efficiency particulate air (HEPA) filters. According a further aspect, there are two filters per fan unit. According to another aspect, there is more than one fan unit per two filters. That is, multiple fan units may each draw and push air through the same two filters. The size of the filters 710a, 710b may be selected based on the number of fan units, the size of each fan unit, etc.

According to a further aspect, each of the plurality of fan units 720a, 720b are axial-flow fans. In a further aspect, each of the plurality of fan units 720a, 720b are axial-flow box fans. For example and without limitation, the axial-flow box fans may be single, twin, or tri window fans, personal computer (PC) fans (e.g. case fans, CPU fans, PSU fans, and the like), or 12-Volt fans (i.e., fans of 12-volt power input). According to a further aspect, the plurality of fan units 720a, 720b may each have a size of 40 mm to 220 mm.

According to a further aspect, each of the plurality of fan units 720a, 720b is configured for independent operation. That is, each of the plurality of fan units 720a, 720b may be independently turned on and off, and/or the direction of airflow may be independently reversed. In a particular aspect, the ventilation assembly 700 may be configured to have a first working mode wherein less than all of the plurality of fan units 720a, 720b operate at the same time, and a second working mode wherein all of the plurality of fan units operate simultaneously. The first working mode may be used when full-speed ventilation is not required and/or when a user is trying to reduce electricity costs. The second working mode may be used when full-speed ventilation is required (e.g. to form positive pressure within a closed structure).

In a yet further aspect, the ventilation assembly of the present disclosure comprises one or more heat exchangers. As illustrated in FIG. 16, the example ventilation assembly 700 comprises two heat exchanges 730a, 730b. The heat exchangers 730a, 730b may act as a heat sink to manage the heat of the plurality of fan units 720a, 720b. As will be appreciated, depending on the type of fan unit employed and the length of time that the fan unit is operated, the fan unit may produce heat. In order to avoid the fan units overheating, the heat exchangers 730a, 730b may be used. The heat exchangers 730a, 730b are positioned in contact with the plurality of fan units 720a, 720b and between opposing filters 710a, 710b. In one aspect, there is one heat exchanger per fan unit. In another aspect, there is more than one fan unit per heat exchanger. The heat exchangers 730a, 730b may be any type known in the art. According to one aspect, the heat exchangers 730a, 730b are honeycomb type heat exchangers. In a particular aspect, the heat exchangers 730a, 730b are ceramic heat exchangers.

In a yet further aspect, the components of the ventilation assembly 700 may be operably secured together by way of, for example, fasteners including one or more bolts, screws, or the like, or an adhesive such as epoxy. Alternatively, in another aspect, the components of the ventilation assembly 700 may be operably housed within a casing (not shown). The casing may be formed of metal, plastic, or a combination thereof.

Once the components of the ventilation assembly 700 are secured together, the ventilation assembly 700 may be installed at a desired location. In the context of the mobile home 100, the ventilation assembly 700 may be installed in one of the walls 104a, 104b, 104c, 104d such that one end of the ventilation assembly 700 is inside the mobile home 100 and another end is outside the mobile home 100. In some embodiments, one or more ventilation assemblies 700 may be installed on a wall adjacent a bed and at locations above the bed for providing fresh air to the person in the bed. In some embodiments, one or more ventilation assemblies 700 may be installed on a wall adjacent a desk and at locations above the desk for providing fresh air to the person around the desk.

The ventilation assembly may be installed using any suitable method. As well, the mobile home 100 may have more than one ventilation assembly 700 installed therein. For example, the mobile home 100 may have two or more ventilation assemblies 700. In such instances, the ventilation assemblies may be used together for forming a positive pressure in the mobile home 100 or to rapidly remove a positive pressure.

Once the ventilation assembly 700 is installed, the ventilation assembly 700 may be controlled using one or more of a control panel mounted thereon and a remote control. The control panel and/or remote control comprise necessary control circuitry and may be used to selectively operate individual fan units of the ventilation assembly 700. For example, and as indicated above, the fan units 720a, 720b may be independently turned off and on, as well as being independently reversible (i.e. the direction in which the fan unit moves air may be changed). The control panel and/or remote control may be configured using any suitable manner known in the art.

Airflow Control

In some embodiments, the control circuitry may be functionally coupled to one or more sensors associated with the rocket stove 200 for determining the state thereof and control the operation of the ventilation assembly 700 based on the determined state of the rocket stove 200. Herein, the rocket stove 200 is operable in a burning state or operation state wherein fuels are burning in the rocket stove 200, and an idle state wherein no fuel is burning therein. The control circuitry may be connected to the one or more sensors using any suitable wired or wireless communication technologies such as parallel cables, serial cables, USB cables, optical connections, Ethernet, WIFI® (WI-FI is a registered trademark of Wi-Fi Alliance, Austin, Tex., USA), BLU- ETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), 3G, 4G and/or 5G wireless mobile telecommunications technologies, and/or the like.

For example, in one embodiment, a temperature sensor may be installed on the rocket stove 200 and functionally coupled to the control circuitry. The control circuitry may determine that the rocket stove 200 is in an operation state when the temperature measured by the temperature sensor is greater than a first predefined temperature threshold, and the stove 200 is in an idle state when the temperature measured by the temperature sensor is smaller than a second predefined temperature threshold (which is equal to or smaller than the first temperature threshold).

In another embodiment, a light sensor may be installed on the rocket stove 200 and functionally coupled to the control circuitry using suitable wired or wireless communication technologies. The control circuitry may determine that the rocket stove 200 in the operation state when the light-intensity measurement output from the light sensor is greater than a predefined light-intensity threshold, and the stove 200 is in the idle state when the light-intensity measurement output from the light sensor is smaller than a second predefined light-intensity threshold (which is equal to or smaller than the first light-intensity threshold).

In still another embodiment, the control circuitry may comprise a user input such as a switch, a physical push-button, or a virtual button on a touchscreen to allow a user to manually set the state of the rocket stove 200 to the operation state or the idle state.

Figure 17:
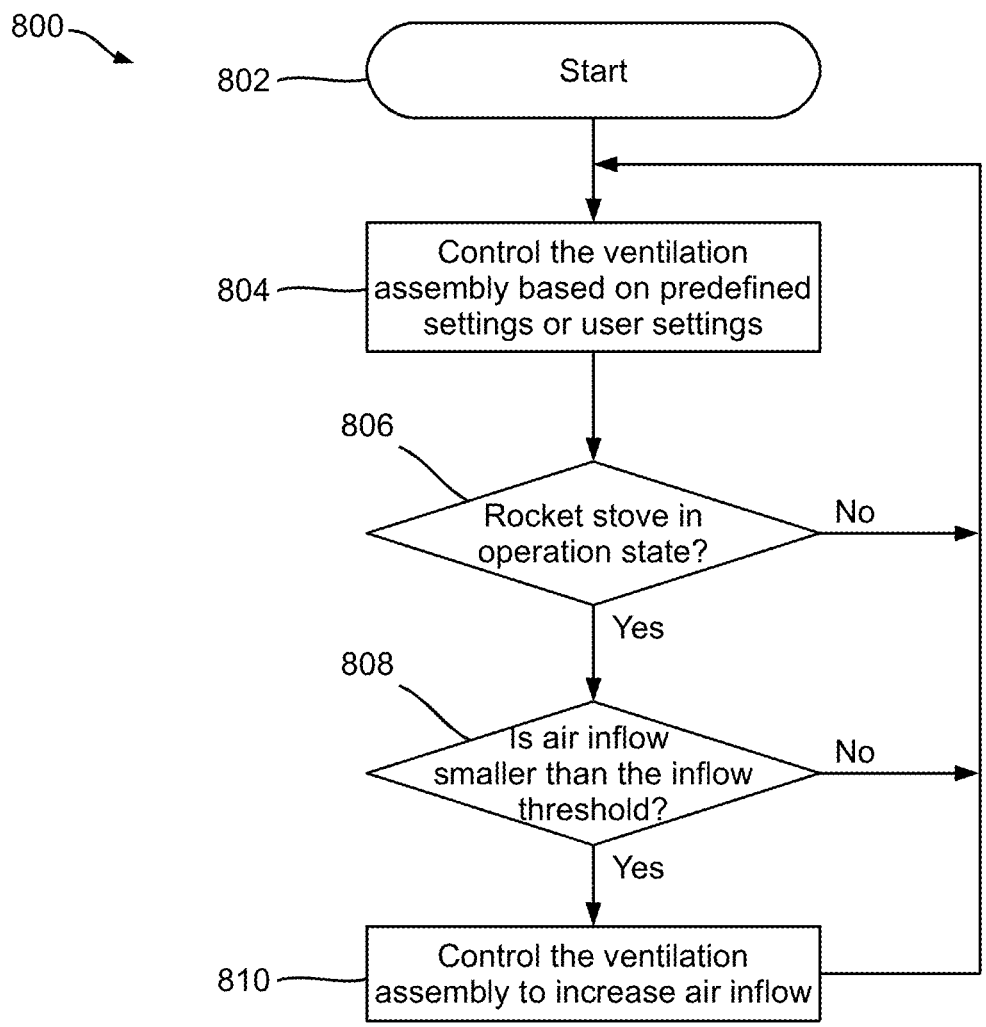
FIG. 17 is a flowchart showing a process executed by a control circuitry of the mobile home shown in FIG. 1 for controlling the ventilation assembly shown in FIG. 17 based on the state of the rocket stove, according to an embodiment of the present disclosure.

FIG. 17 is a flowchart 800 showing a process executed by the control circuitry for controlling the ventilation assembly 700 based on the state of the rocket stove 200.

As shown, the process starts (step 802) when the control circuitry is turned on. At step 804, the control circuitry controls the ventilation assembly 700 based on predefined settings or, if the user has provided customized settings (e.g. via a touchscreen functionally coupled to the control circuitry), based on the user settings.

At step 806, the control circuitry checks and determines the state of the rocket stove 200 as described above. If the control circuitry determines that the rocket stove 200 is in the idle state (the "No" branch of step 806), the process 800 loops back to step 804.

If at step 806, the control circuitry determines that the rocket stove 200 is in the operation state (the "Yes" branch of step 806), the control circuitry further checks if the air inflow is smaller than a predefined air-inflow threshold required for safe operation of the rocket stove 200 (step 808).

In these embodiments, the air inflow may be determined by using an airflow sensor coupled to the ventilation assembly 700, or by measuring the air-pressure change using a pressure sensor in the mobile home 100.

If at step 808, the control circuitry determines that the air inflow is greater than or equal to the predefined air-inflow threshold (the "No" branch of step 808), e.g., if the air pressure in the mobile home 100 is above a predefined pressure threshold, the process 800 then loops back to step 804.

If at step 808, the control circuitry determines that the air inflow is smaller than the predefined air-inflow threshold (the "Yes" branch of step 808), e.g., if the air pressure in the mobile home 100 is below a predefined pressure threshold, the control circuitry then controls the ventilation assembly 700 to increase the air-inflow (step 810) such that the air inflow is greater than the predefined air-inflow threshold or until the air pressure in the mobile home 100 is above the predefined pressure threshold.

In some embodiments, the control circuitry may store one or more predefined fan-unit speeds and may adjust each fan unit of the ventilation assembly 700 at a respective one of the one or more predefined fan-unit speeds to ensure sufficient air-inflow.

In some embodiments, the control circuitry may adjust the speed of each fan unit of the ventilation assembly 700 based on the measurement of air-inflow to maintain the air-inflow at a sufficient level or at a predefined level. In some other embodiments, the control circuitry may adjust the speed of each fan unit of the ventilation assembly 700 based on the air-pressure drop rate to compensate for the air-pressure drop until the air pressure drop is stopped (i.e., zero air-pressure drop).

After performing step 808, the process loops back to step 804.

As will be appreciated, while the ventilation assemblies of the present disclosure have been described largely in the context of mobile homes, it will be appreciated that the ventilation assemblies are suitable for use in all types of homes or structures.

Although embodiments have been described above with reference to the accompanying drawings, those of skill in the art will appreciate that variations and modifications may be made without departing from the scope thereof as defined by the appended claims.

What is claimed is:

1. A mobile home comprising:
   a housing body having one or more walls;
   a rocket stove received in the housing body, the rocket stove being operable in a burning state and an idle state;
   a ventilation assembly coupled to one of the one or more walls; and
   a control circuitry functionally coupled to the rocket stove and the ventilation assembly;
   wherein the rocket stove comprises:
      a vertical chimney for delivering heat to a stove top, and
      a tee having at least a first end for coupling to the vertical chimney via an elbow, a second for receiving a fuel source therein, and a third end;
   wherein the ventilation assembly comprises:
      at least two opposing air filters, and
      a plurality of fan units positioned side-by-side and sandwiched between the at least two opposing air filters, each of the plurality of fan units being controllable for generating airflow into and out of the housing body; and
   wherein the control circuitry is for controlling the ventilation assembly for adjusting the airflow into the housing body based on the state of the rocket stove.

2. The mobile home of claim 1, wherein the third end of the tee extends to a position below the elbow, for receiving ash produced by burning the fuel source.

3. The mobile home of claim 1, wherein the tee further comprises a fourth end.

4. The mobile home of claim 1, wherein the elbow is a 90° elbow or a 135° elbow.

5. The mobile home of claim 4, wherein the second end of the tee extends in a direction parallel to the vertical chimney or in a direction perpendicular to the vertical chimney.

6. The mobile home of claim 1, wherein the elbow is a 135° elbow; and wherein the second end of the tee extends in a direction that is 45° relative to the vertical chimney, and/or the second end of the tee is an extended end having a length greater than that of the first and the second ends of the tee.

7. The mobile home of claim 1, wherein the vertical chimney comprises a tapered end coupled to the elbow.

8. The mobile home of claim 1, wherein the rocket stove further comprises insulating materials coupled to external surfaces of the vertical chimney, the tee, and the elbow and wherein the insulating materials comprise aerogel.

9. The mobile home of claim 1, wherein the plurality of fan units are reversible.

10. The mobile home of claim 1, wherein the housing body comprises at least one pre-marked area on one or more walls of the housing body for indicating where a cutout for receiving a feature or an appliance of the mobile home therein is to be made.

11. The mobile home of claim 10, wherein the housing body is a standard 40-foot steel container.

12. The mobile home of claim 10 further comprising a chassis for providing structural support to the housing body, the chassis secured to a bottom wall of the housing body; and
wherein the chassis comprises a pair of channels configured to receive forklift arms therethrough.

13. The mobile home of claim 10 further comprising one or more solar panels mounted to a top wall of the housing body.

14. The mobile home of claim 1 further comprising one or more first sensors in communication with the control circuitry for determining the state of the rocket stove;
wherein the control circuitry is configured for determining that the rocket stove is in the burning state when an output of at least one of the one or more first sensors is higher than a predefined first threshold;
wherein the control circuitry is configured for determining that the rocket stove is in the idle state when the output of the at least one of the one or more first sensors is lower than a predefined second threshold; and
wherein the control circuitry is configured for instructing the ventilation assembly to operate for increasing airflow into the housing body when the rocket stove is in the burning state.

15. The mobile home of claim 14, wherein the at least one of the one or more first sensors is a temperature sensor associated with the rocket stove; and wherein the output of the at least one of the one or more first sensors is a temperature value.

16. The mobile home of claim 14, wherein the at least one of the one or more first sensors is a light sensor associated with the rocket stove; and wherein the output of the at least one of the one or more first sensors is a light-intensity value.

17. The mobile home of claim 14, wherein the control circuitry is configured for instructing the ventilation assembly to operate for increasing airflow into the housing body after receiving a user input indicating that the rocket stove is in the burning state.

18. The mobile home of claim 1 further comprising one or more second sensors in communication with the control circuitry for measuring airflow through the ventilation assembly.

19. The mobile home of claim 1 further comprising one or more air-pressure sensors in communication with the control circuitry for measuring air pressure in the housing body;
wherein the control circuitry is configured for instructing the ventilation assembly to operate at a speed determined based on the rate of air-pressure drop in the housing body.

20. The mobile home of claim 1, wherein the control circuitry is configured for instructing the ventilation assembly to operate at a predefined speed when the rocket stove is in the burning state.

* * * * *